US012658176B2

(12) United States Patent
Suzuki

(10) Patent No.: US 12,658,176 B2
(45) Date of Patent: Jun. 16, 2026

(54) INFORMATION PROCESSING DEVICE AND INFORMATION PROCESSING METHOD

(71) Applicant: SONY GROUP CORPORATION, Tokyo (JP)

(72) Inventor: Saya Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 193 days.

(21) Appl. No.: 18/577,305

(22) PCT Filed: Mar. 17, 2022

(86) PCT No.: PCT/JP2022/012275
§ 371 (c)(1),
(2) Date: Jan. 8, 2024

(87) PCT Pub. No.: WO2023/002694
PCT Pub. Date: Jan. 26, 2023

(65) Prior Publication Data
US 2024/0249713 A1      Jul. 25, 2024

(30) Foreign Application Priority Data

Jul. 20, 2021     (JP) ................................. 2021-119655

(51) Int. Cl.
*G10L 15/18*          (2013.01)
*G10L 15/01*          (2013.01)
*G10L 15/183*         (2013.01)
(52) U.S. Cl.
CPC ............ *G10L 15/01* (2013.01); *G10L 15/183* (2013.01)

(58) Field of Classification Search
CPC ......... G10L 15/01; G10L 15/18; G10L 15/02; G10L 15/22; G10L 13/033; G10L 17/00; G06F 21/32; G06F 3/167; G06F 21/316
See application file for complete search history.

(56) References Cited

U.S. PATENT DOCUMENTS 9,401,925 B1 *   7/2016  Guo ...................... G06F 21/552
9,530,431 B2 * 12/2016  Nakata ................... G09B 19/04
(Continued)

FOREIGN PATENT DOCUMENTS

JP       2011-103063 A       5/2011
JP       2019-036171 A       3/2019
(Continued)

OTHER PUBLICATIONS

International Search Report and Written Opinion of PCT Application No. PCT/JP2022/012275, issued on Jun. 21, 2022, 10 pages of ISRWO.
(Continued)

*Primary Examiner* — Jakieda R Jackson
(74) *Attorney, Agent, or Firm* — CHIP LAW GROUP

(57)          ABSTRACT

Provided is an information processing device that includes a role presentation unit that presents, to a first user, a role set to the first user, an acquisition unit that acquires first data input by the first user at a time of input of the first data, a detection unit that detects, as inconsistency information, information that is included in the first data acquired by the acquisition unit and inconsistent with the role, and an inconsistency presentation unit that presents, to the first user, a message based on the inconsistency information detected from the first data by the detection unit.

18 Claims, 22 Drawing Sheets

(56) References Cited

U.S. PATENT DOCUMENTS

| | | | | |
|---|---|---|---|---|
| 9,600,834 | B2 * | 3/2017 | Kilroy | G06Q 30/0271 |
| 10,754,936 | B1 * | 8/2020 | Hawes | H04L 63/08 |
| 11,816,932 | B1 * | 11/2023 | Tang | G06V 10/761 |
| 11,947,872 | B1 * | 4/2024 | Mahler-Haug | G10L 15/08 |
| 2009/0006856 | A1 * | 1/2009 | Abraham | G06F 21/55 |
| | | | | 713/183 |
| 2009/0228294 | A1 * | 9/2009 | Choi | G06Q 90/00 |
| | | | | 705/317 |
| 2011/0246198 | A1 * | 10/2011 | Asenjo | G10L 17/00 |
| | | | | 704/E17.001 |
| 2013/0158984 | A1 * | 6/2013 | Myslinski | G06Q 50/01 |
| | | | | 704/9 |
| 2014/0280592 | A1 * | 9/2014 | Zafarani | H04L 67/535 |
| | | | | 709/204 |
| 2014/0317101 | A1 * | 10/2014 | Myslinski | G06F 16/95 |
| | | | | 707/723 |
| 2014/0333414 | A1 * | 11/2014 | Kursun | G06V 40/50 |
| | | | | 340/5.82 |
| 2015/0026062 | A1 * | 1/2015 | Paulsen | G06Q 20/29 |
| | | | | 705/44 |
| 2015/0156208 | A1 * | 6/2015 | Kirkham | G06F 21/31 |
| | | | | 726/4 |
| 2016/0048549 | A1 * | 2/2016 | Patterson | H04W 4/029 |
| | | | | 707/690 |
| 2016/0253999 | A1 * | 9/2016 | Kang | G10L 17/00 |
| | | | | 704/249 |
| 2019/0114689 | A1 * | 4/2019 | Wang | G06Q 30/0224 |
| 2019/0325079 | A1 * | 10/2019 | Blake | G06F 16/3334 |
| 2020/0112755 | A1 * | 4/2020 | Seshadri | G06N 3/0455 |
| 2020/0120384 | A1 * | 4/2020 | Armaly | H04N 21/44218 |
| 2020/0243101 | A1 * | 7/2020 | Huffman | G10L 15/02 |
| 2020/0314471 | A1 * | 10/2020 | Srinivasan | H04N 21/252 |
| 2020/0342081 | A1 * | 10/2020 | Nam | G06F 9/4881 |
| 2020/0349249 | A1 * | 11/2020 | Weston | G06V 40/171 |
| 2020/0380980 | A1 * | 12/2020 | Shum | G10L 15/18 |
| 2021/0019636 | A1 * | 1/2021 | Ishii | G06N 7/01 |
| 2021/0399911 | A1 * | 12/2021 | Jorasch | H04L 12/1818 |
| 2022/0101873 | A1 * | 3/2022 | Burmistrov | G06F 3/167 |
| 2022/0417047 | A1 * | 12/2022 | Foufa | H04M 3/563 |

FOREIGN PATENT DOCUMENTS

| | | | |
|---|---|---|---|
| JP | | 2020-027548 A | 2/2020 |
| JP | | 2020-113156 A | 7/2020 |

OTHER PUBLICATIONS

Ishii, et al., "Construction Method of Text-based Agent Dialogue System using Existing Animation Characters", Human-Agent Interaction Symposium (HAI2018); Mar. 8-9, 2018, p. 1-11.

Okano, et al., "Prototype of Control Response Pair Evaluation Set for Automatic Evaluation of Neural Dialogue Models", Proceedings of the Twenty-seventh Annual Meeting of the Association for Natural Language Processing, Mar. 15-19, 2021, pp. 1585-1589.

Ikeda, et al., "Asynchronous Chat System for Dialogue Collection on Crowdsourcing", 32nd Annual Conference of the Japanese Society for Artificial Intelligence (JSAI), Jun. 5-8, 2018, pp. 1-4.

Zhang, et al., "Personalizing Dialogue Agents: I have a dog, do you have pets too?", Proceedings of the 56th Annual Meeting of the Association for Computational Linguistics, Sep. 25, 2018, 16 pages.

* cited by examiner

10
SERVER

2

20a
WORKER
TERMINAL

20b
WORKER
TERMINAL

WORKER X

WORKER Y

20

210

BROWSER
APPLICATION

202
INPUT UNIT

200
CONTROL
UNIT

203
DISPLAY UNIT

201
COMMUNICA-
TION UNIT

31

311

ROLE OF YOU

310a

[PROFILE]

1 FEMALE/SECOND-GRADER IN
HIGH SCHOOL/17 YEARS OLD
2 FEMININE WAY OF SPEAKING
3 POP IDOL ACTIVITY
4 HAVING OLDER BROTHER
5 ENJOY COOKING AS PASTIME

FIG. 7A
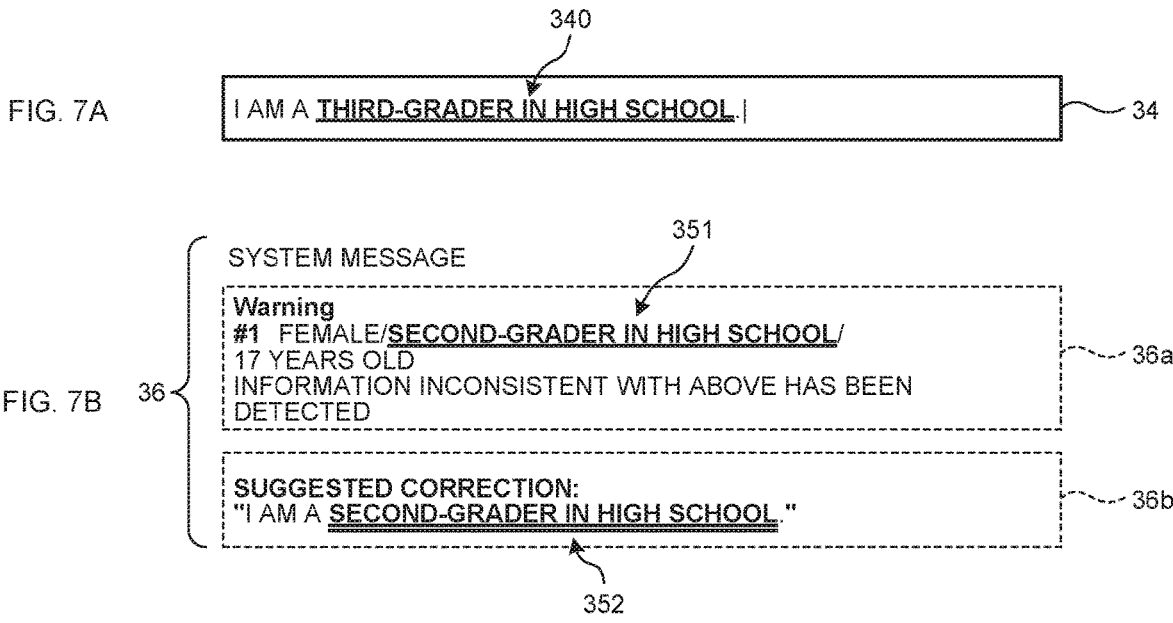
FIG. 7B
FIG. 8A
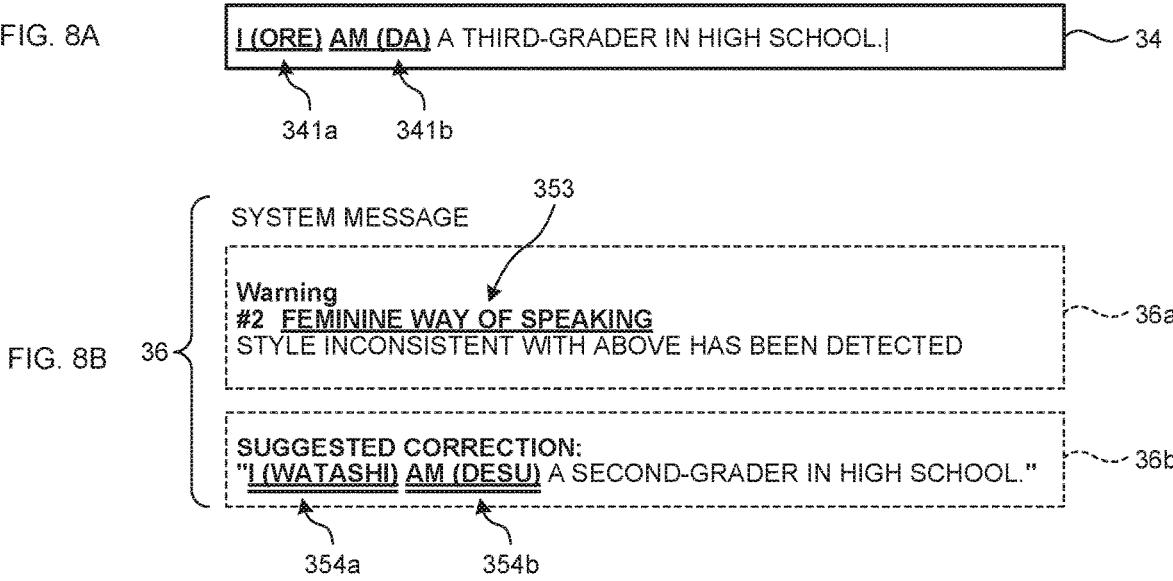
FIG. 8B

31a

311a

AT WORK

310a

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND
TALKING

AT SCHOOL

310b

311b

[PROFILE]
1 FEMALE/SECOND-GRADER IN
HIGH SCHOOL/17 YEARS OLD
2 FEMININE WAY OF SPEAKING
3 POP IDOL ACTIVITY
4 HAVING OLDER BROTHER
5 ENJOY COOKING AS PASTIME

FIG. 9B     32

SITUATION
TALKING AT SCHOOL WITH FRIENDS ABOUT
FAMILY.

FIG. 10A
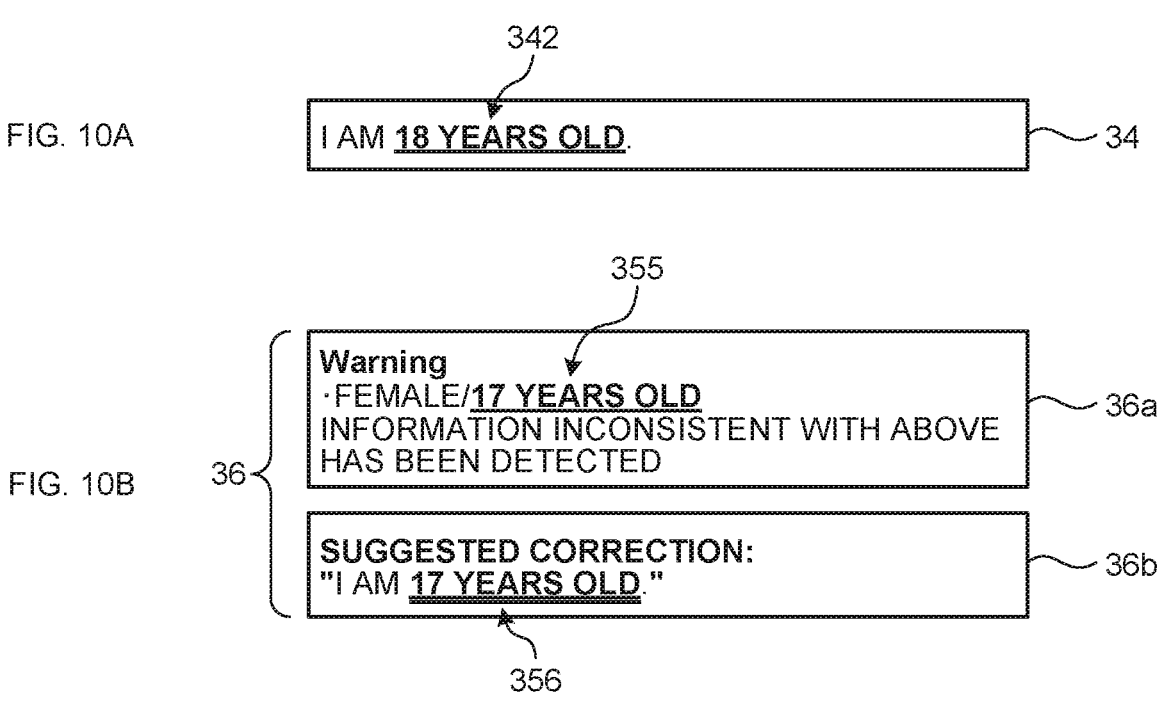
FIG. 10B
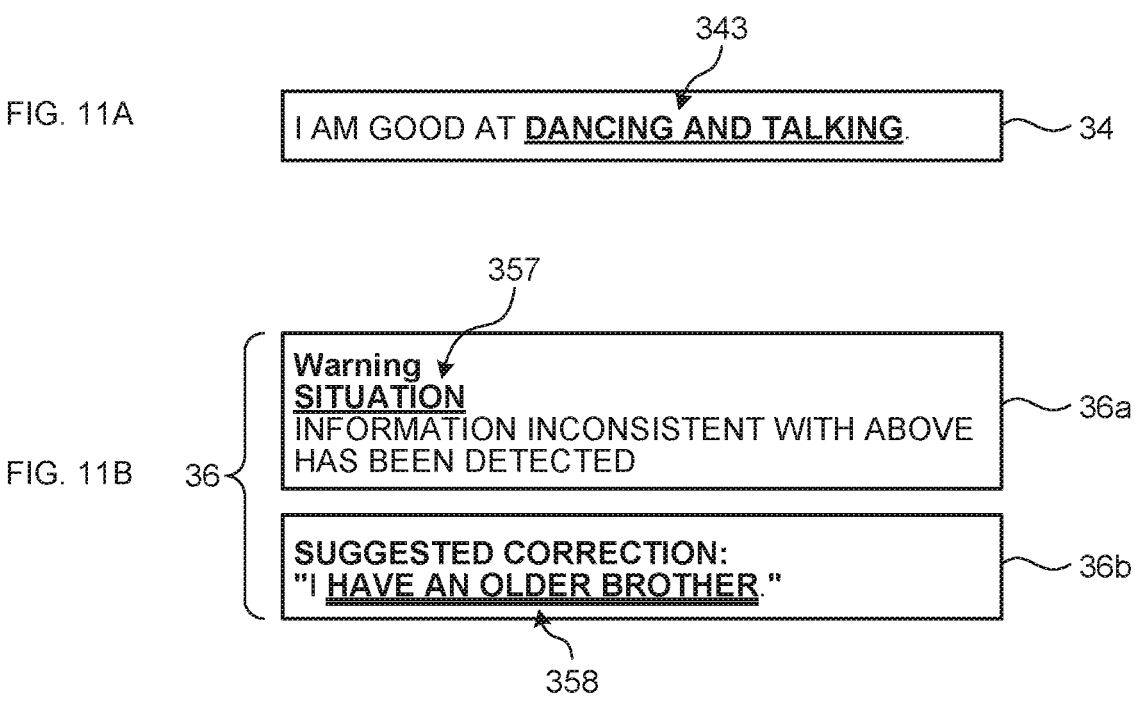
FIG. 11A
FIG. 11B

31a

311a

AT WORK

310a

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND
TALKING

AT SCHOOL

310b

311b

[PROFILE]
1 FEMALE/SECOND-GRADER IN
HIGH SCHOOL/17 YEARS OLD
2 FEMININE WAY OF SPEAKING
3 POP IDOL ACTIVITY
4 HAVING OLDER BROTHER
5 ENJOY COOKING AS PASTIME

SITUATION
TALKING ABOUT SPECIAL SKILLS.

FIG. 13A
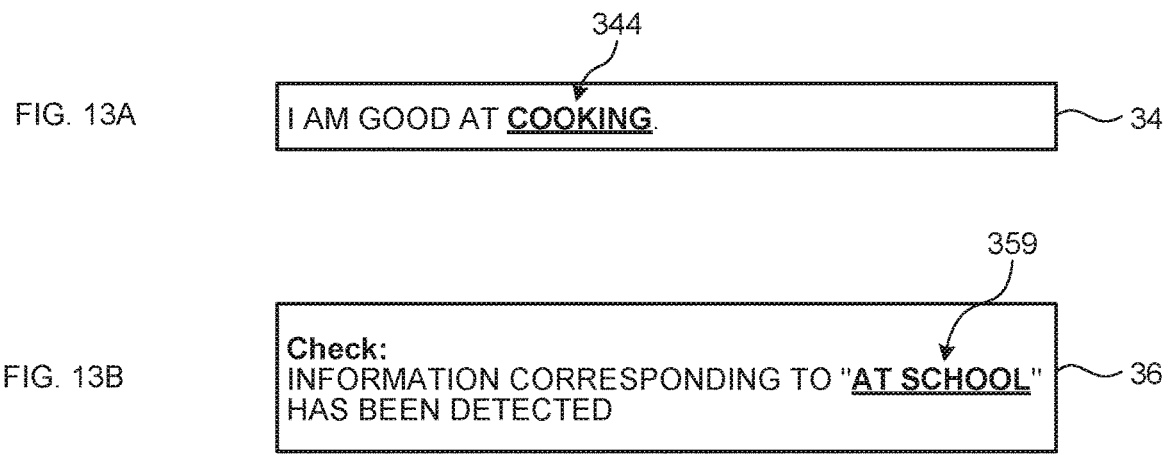
FIG. 13B
FIG. 14A
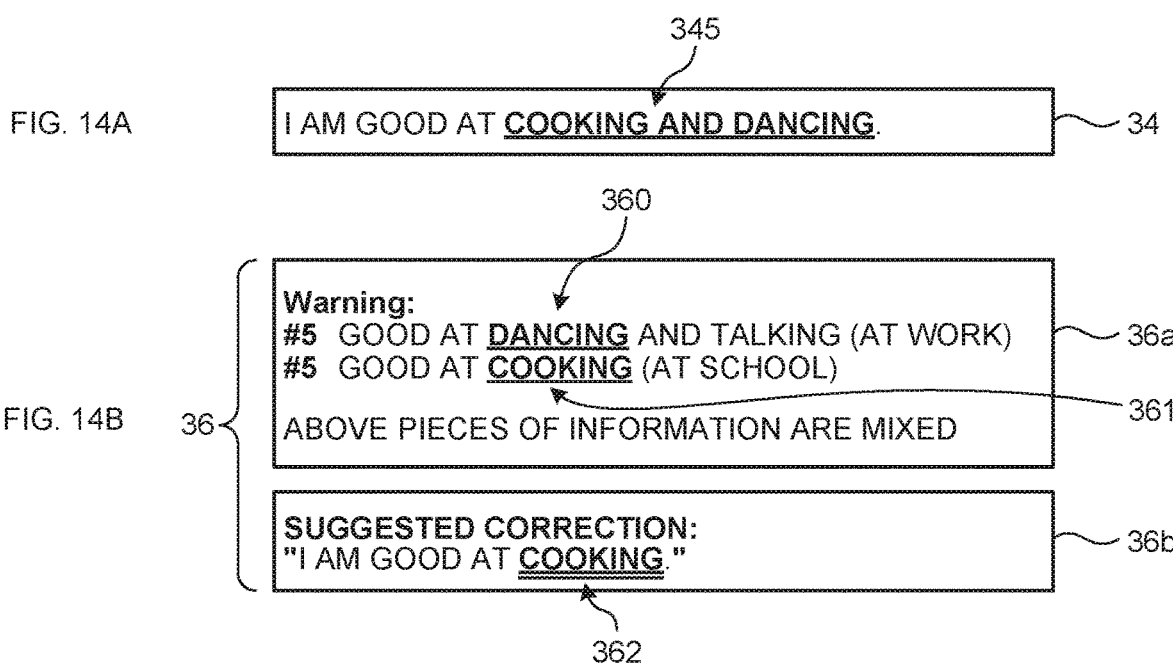
FIG. 14B

FIG. 16

|  | THERE IS SEMANTIC INCLUSION RELATION | THERE IS PARTIAL SEMANTIC INCLUSION RELATION | THERE IS NO SEMANTIC INCLUSION RELATION |
|---|---|---|---|
| INFORMATION WITH UNIQUE VALUE | (1) NO WARNING ISSUED | (3) WARNING IS ISSUED | (5) WARNING IS ISSUED |
| INFORMATION THAT CAN TAKE PLURALITY OF VALUES | (2) NO WARNING ISSUED | (4) WARNING IS ISSUED | (6) WARNING IS ISSUED |

FIG. 17

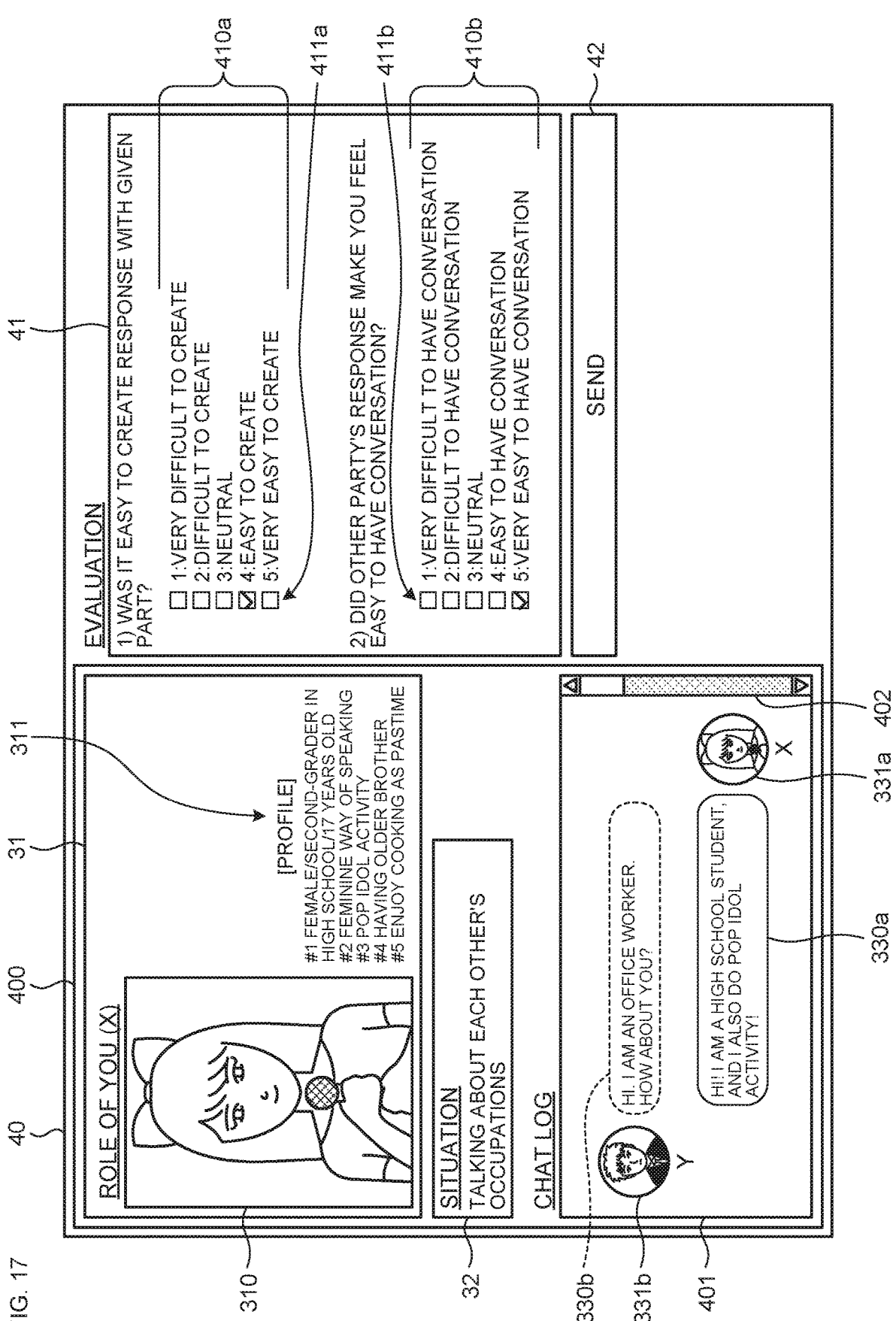

EVALUATION

1) WAS IT EASY TO CREATE RESPONSE WITH GIVEN PART?

☐ 1:VERY DIFFICULT TO CREATE
☐ 2:DIFFICULT TO CREATE
☐ 3:NEUTRAL
☑ 4:EASY TO CREATE
☐ 5:VERY EASY TO CREATE

2) DID OTHER PARTY'S RESPONSE MAKE YOU FEEL EASY TO HAVE CONVERSATION?

☐ 1:VERY DIFFICULT TO HAVE CONVERSATION
☐ 2:DIFFICULT TO HAVE CONVERSATION
☐ 3:NEUTRAL
☐ 4:EASY TO HAVE CONVERSATION
☑ 5:VERY EASY TO HAVE CONVERSATION

SEND

ROLE OF YOU (X)

[PROFILE]
1 FEMALE/SECOND-GRADER IN HIGH SCHOOL/17 YEARS OLD
2 FEMININE WAY OF SPEAKING
3 POP IDOL ACTIVITY
4 HAVING OLDER BROTHER
5 ENJOY COOKING AS PASTIME

SITUATION
TALKING ABOUT EACH OTHER'S OCCUPATIONS

CHAT LOG

HI. I AM AN OFFICE WORKER. HOW ABOUT YOU?

HI! I AM A HIGH SCHOOL STUDENT, AND I ALSO DO POP IDOL ACTIVITY!

FIG. 19A

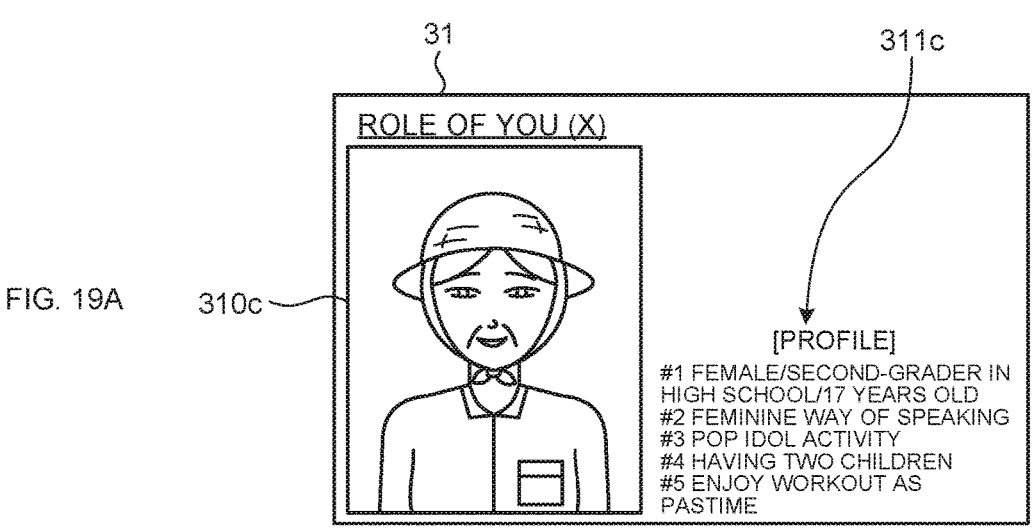

ROLE OF YOU (X)

[PROFILE]
1 FEMALE/SECOND-GRADER IN HIGH SCHOOL/17 YEARS OLD
2 FEMININE WAY OF SPEAKING
3 POP IDOL ACTIVITY
4 HAVING TWO CHILDREN
5 ENJOY WORKOUT AS PASTIME 31
311c
310c

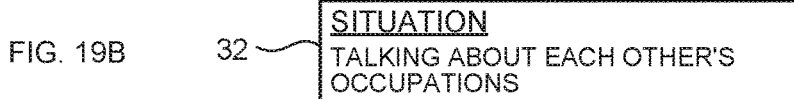

SITUATION
TALKING ABOUT EACH OTHER'S OCCUPATIONS

FIG. 19C

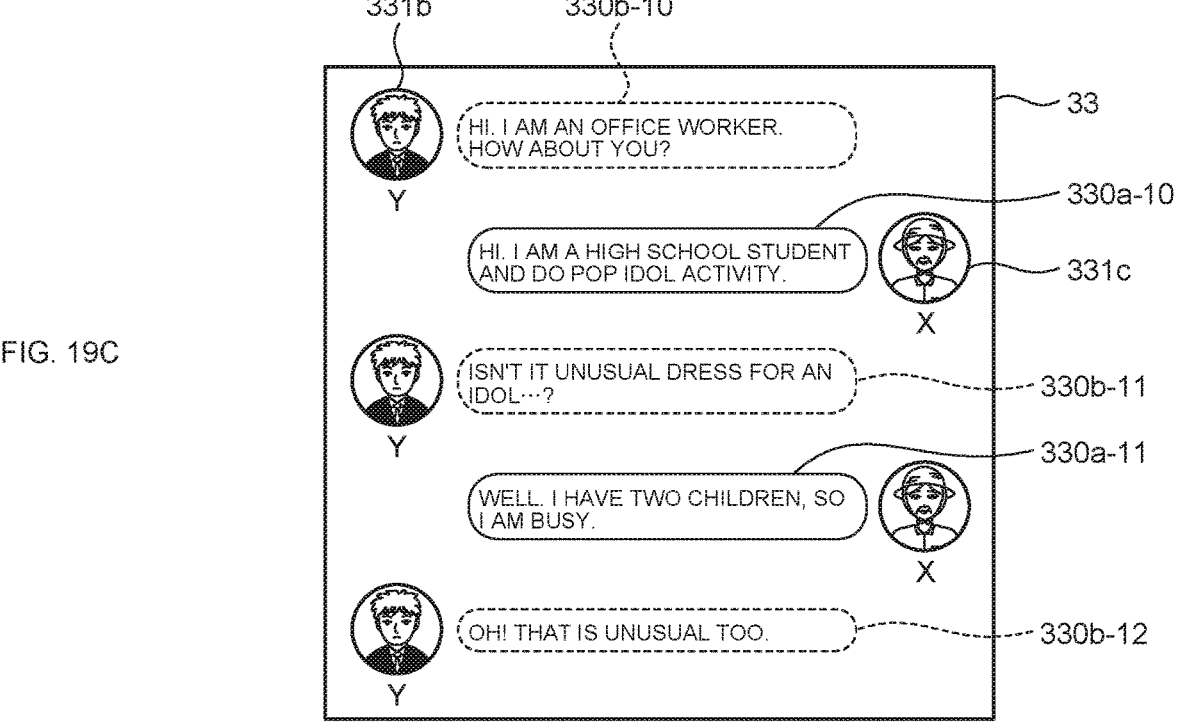

331b
330b-10

Y
HI. I AM AN OFFICE WORKER. HOW ABOUT YOU?

33

HI. I AM A HIGH SCHOOL STUDENT AND DO POP IDOL ACTIVITY.
330a-10
X
331c

Y
ISN'T IT UNUSUAL DRESS FOR AN IDOL···?
330b-11

WELL. I HAVE TWO CHILDREN, SO I AM BUSY.
330a-11
X

Y
OH! THAT IS UNUSUAL TOO.
330b-12

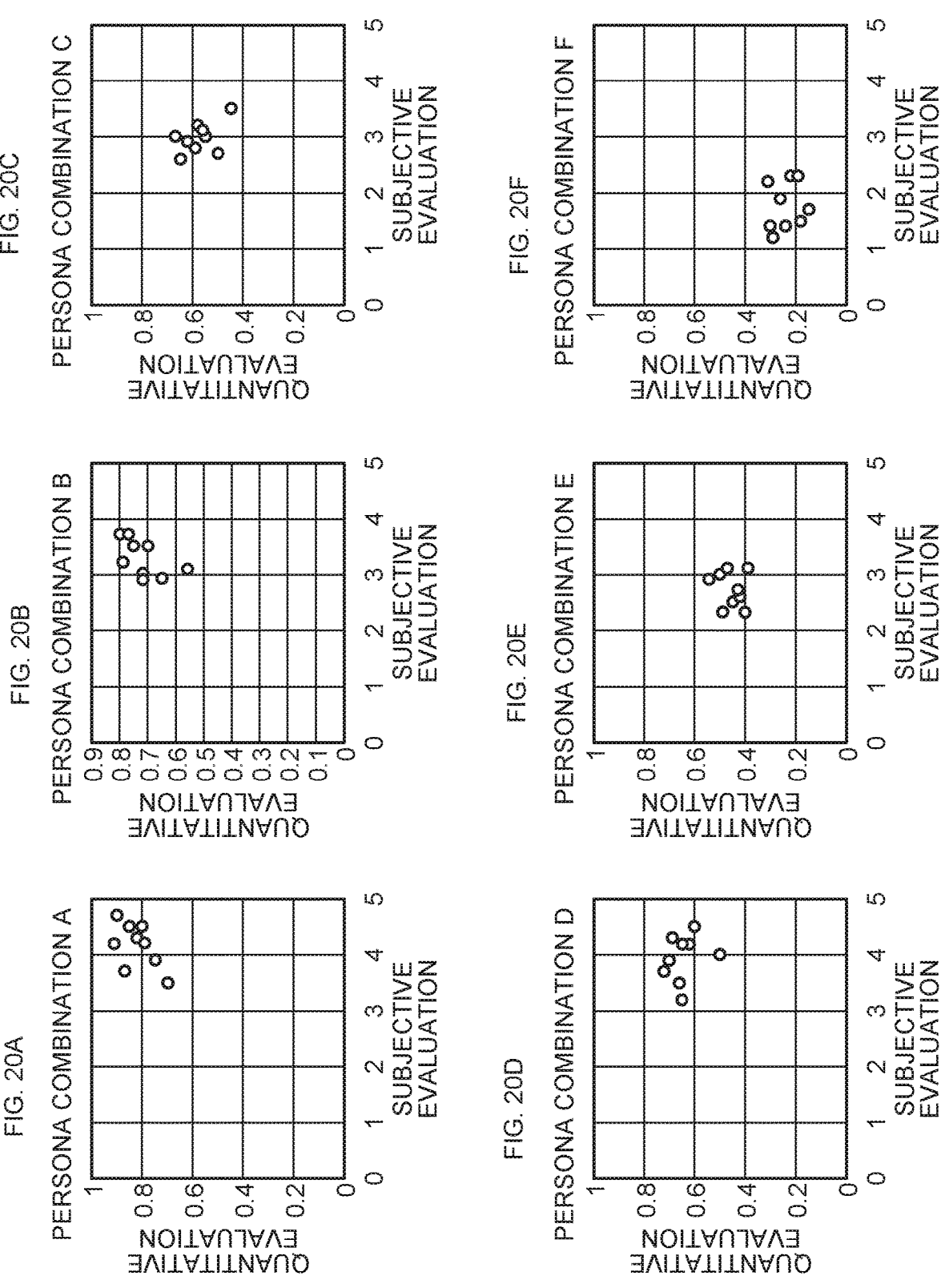

FIG. 21A

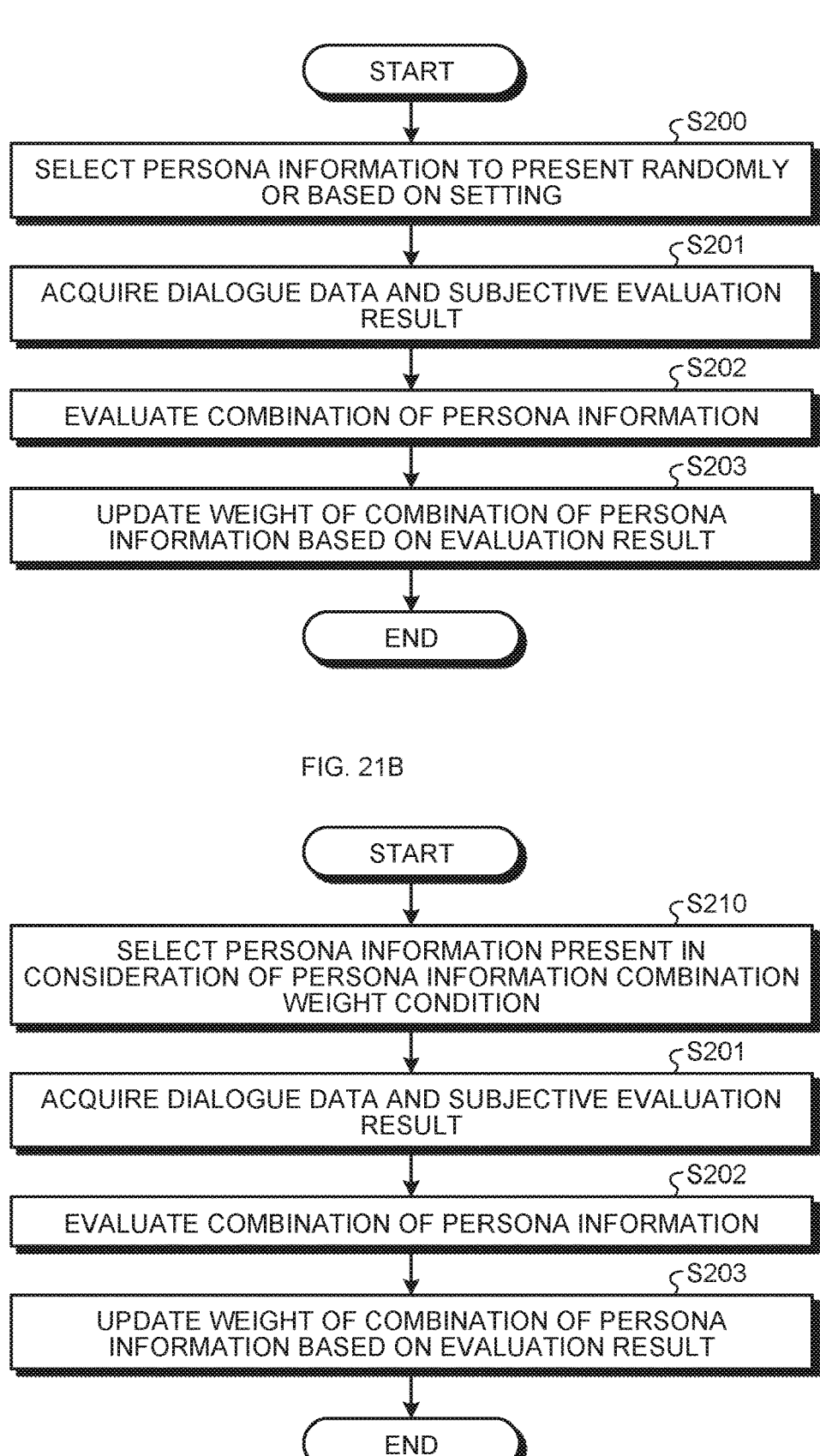

START

S200
SELECT PERSONA INFORMATION TO PRESENT RANDOMLY
OR BASED ON SETTING

S201
ACQUIRE DIALOGUE DATA AND SUBJECTIVE EVALUATION
RESULT

S202
EVALUATE COMBINATION OF PERSONA INFORMATION

S203
UPDATE WEIGHT OF COMBINATION OF PERSONA
INFORMATION BASED ON EVALUATION RESULT

END

FIG. 21B

START

S210
SELECT PERSONA INFORMATION PRESENT IN
CONSIDERATION OF PERSONA INFORMATION COMBINATION
WEIGHT CONDITION

S201
ACQUIRE DIALOGUE DATA AND SUBJECTIVE EVALUATION
RESULT

S202
EVALUATE COMBINATION OF PERSONA INFORMATION

S203
UPDATE WEIGHT OF COMBINATION OF PERSONA
INFORMATION BASED ON EVALUATION RESULT

END

FIG. 23A

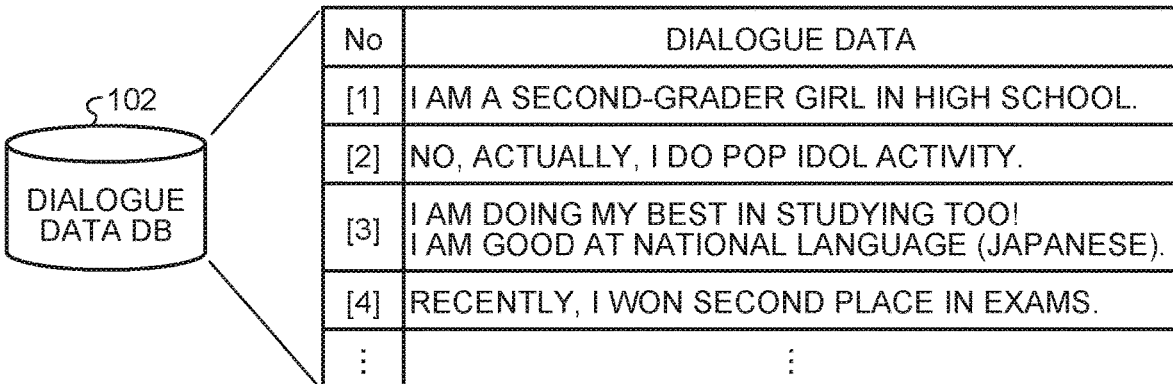

| No | DIALOGUE DATA |
|---|---|
| [1] | I AM A SECOND-GRADER GIRL IN HIGH SCHOOL. |
| [2] | NO, ACTUALLY, I DO POP IDOL ACTIVITY. |
| [3] | I AM DOING MY BEST IN STUDYING TOO! I AM GOOD AT NATIONAL LANGUAGE (JAPANESE). |
| [4] | RECENTLY, I WON SECOND PLACE IN EXAMS. |
| ⋮ | ⋮ |

102 DIALOGUE DATA DB

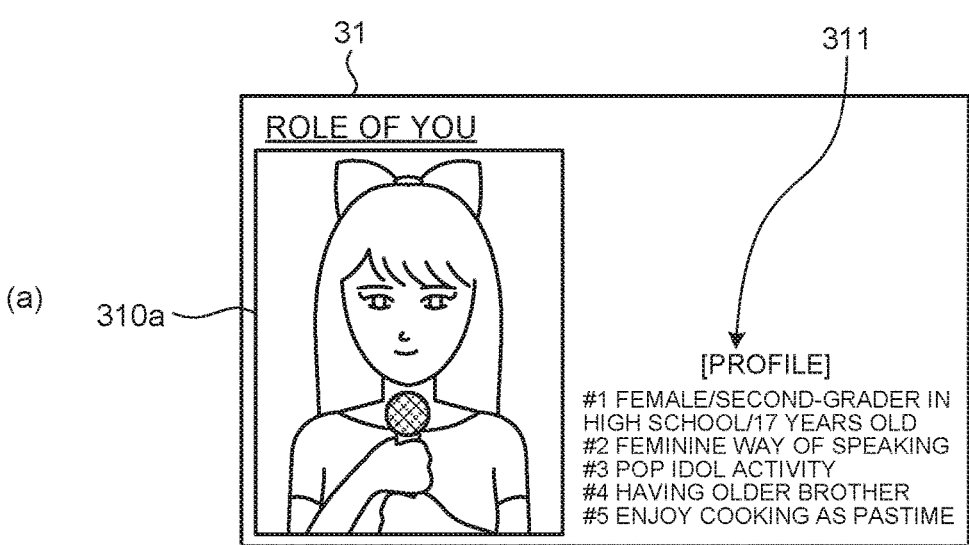

ROLE OF YOU

[PROFILE]
1 FEMALE/SECOND-GRADER IN HIGH SCHOOL/17 YEARS OLD
2 FEMININE WAY OF SPEAKING
3 POP IDOL ACTIVITY
4 HAVING OLDER BROTHER
5 ENJOY COOKING AS PASTIME (b)    34

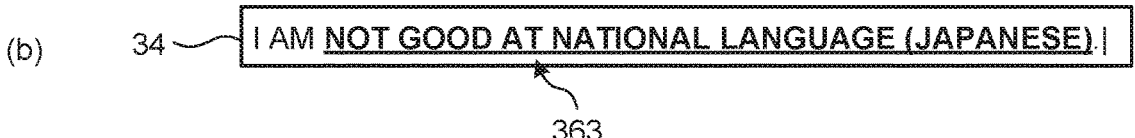

I AM NOT GOOD AT NATIONAL LANGUAGE (JAPANESE) |

363

(c)    35

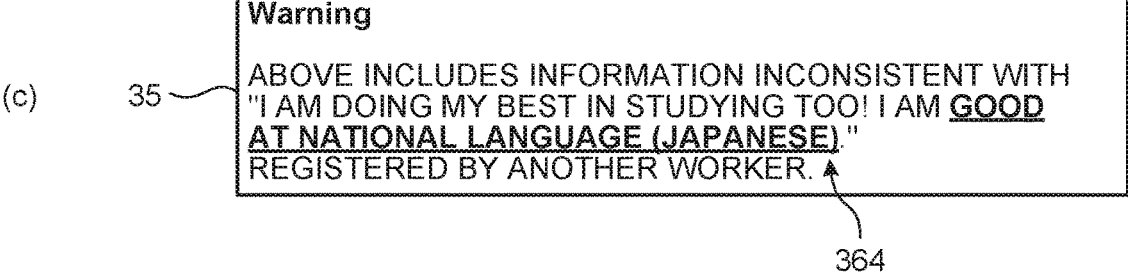

Warning

ABOVE INCLUDES INFORMATION INCONSISTENT WITH "I AM DOING MY BEST IN STUDYING TOO! I AM GOOD AT NATIONAL LANGUAGE (JAPANESE)" REGISTERED BY ANOTHER WORKER.

No Image

511a

[PROFILE]
1 FEMALE/SECOND-GRADER IN HIGH SCHOOL/17 YEARS OLD
2 FEMININE WAY OF SPEAKING
3 POP IDOL ACTIVITY
4 FAVORITE COLOR IS PINK
5 ENJOY COOKING AS PASTIME

510b

511b

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND TALKING

510c

511c

[PROFILE]
1 FEMALE/SECOND-GRADER IN HIGH SCHOOL/17 YEARS OLD
2 FEMININE WAY OF SPEAKING
3 POP IDOL ACTIVITY
4 FAVORITE COLOR IS PINK
5 ENJOY COOKING AS PASTIME

510d

511d

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND TALKING

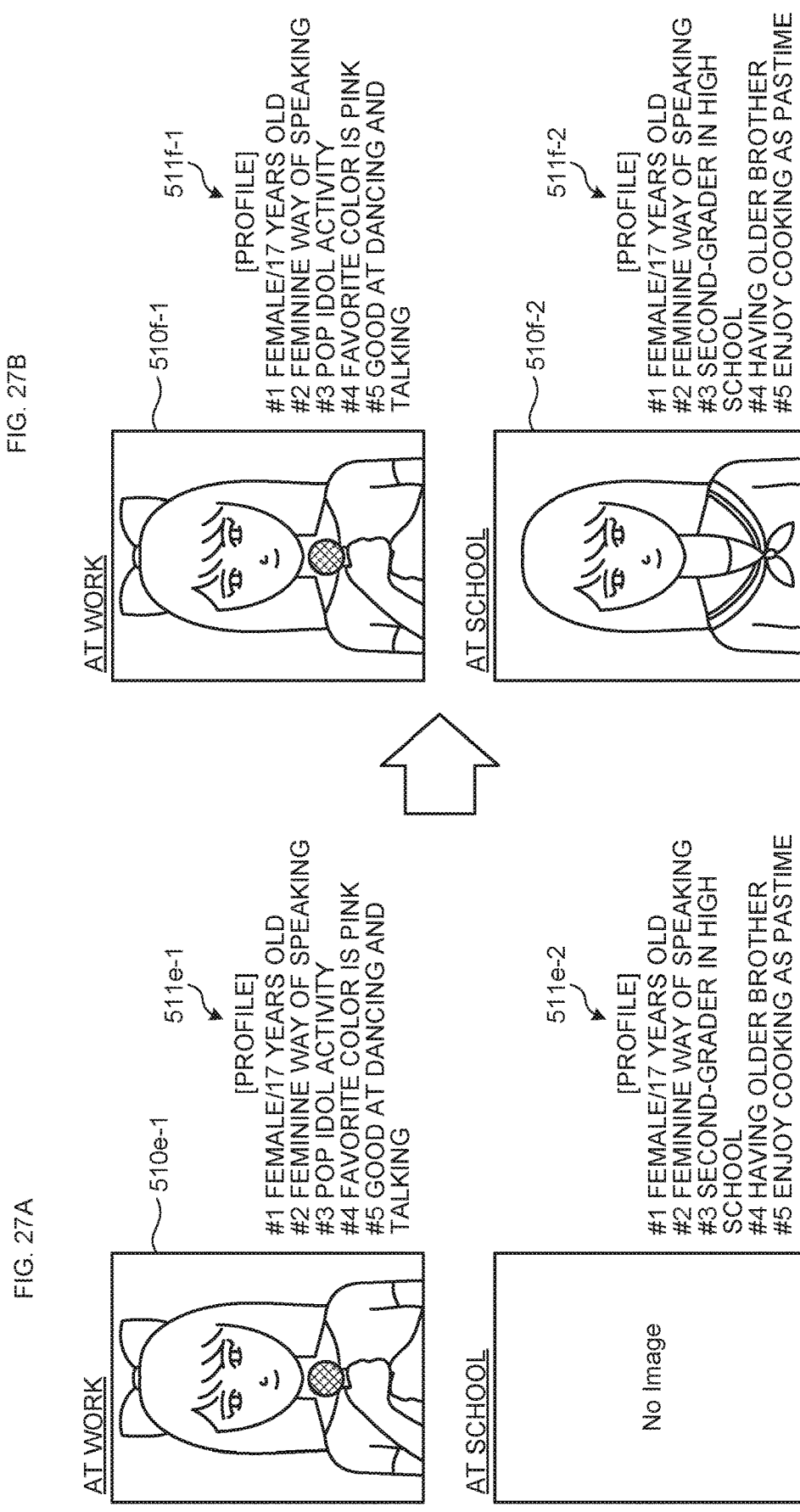

AT WORK

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND TALKING 510e-2
511e-2

AT SCHOOL

No Image

[PROFILE]
1 FEMALE/17 YEARS OLD
2 FEMININE WAY OF SPEAKING
3 SECOND-GRADER IN HIGH SCHOOL
4 HAVING OLDER BROTHER
5 ENJOY COOKING AS PASTIME 510f-1
511f-1

AT WORK

[PROFILE]
1 FEMALE/17 YEARS OLD
2 FEMININE WAY OF SPEAKING
3 POP IDOL ACTIVITY
4 FAVORITE COLOR IS PINK
5 GOOD AT DANCING AND TALKING 510f-2
511f-2

AT SCHOOL

[PROFILE]
1 FEMALE/17 YEARS OLD
2 FEMININE WAY OF SPEAKING
3 SECOND-GRADER IN HIGH SCHOOL
4 HAVING OLDER BROTHER
5 ENJOY COOKING AS PASTIME

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2022/012275 filed on Mar. 17, 2022, which claims priority benefit of Japanese Patent Application No. JP 2021-119655 filed in the Japan Patent Office on Jul. 20, 2021. Each of the above-referenced applications is hereby incorporated herein by reference in its entirety.

FIELD

The present disclosure relates to an information processing device and an information processing method.

BACKGROUND

In recent years, there are increasing demands for an automatic dialogue system that has a dialogue with a user using artificial intelligence. Furthermore, setting a specific persona (for example, a profile) for the artificial intelligence in such an automatic dialogue system enables a more natural conversation between the user and the artificial intelligence. For example, in the automatic dialogue system, the artificial intelligence has a dialogue with the user using a model pretrained in accordance with a specific persona.

Training the model used by the artificial intelligence in the automatic dialogue system needs data set based on a large amount of dialogue data including more natural dialogues. Although it is also possible to collect this data set manually, the cost would increase in this case. Therefore, methods of automatically collecting data sets for training the model have been proposed (for example, Patent Literature 1 and Non Patent Literature 1).

For example, Patent Literature 1 uses a method in which a system presents a specific responder, a first user posts a question to the responder to the system, and a second user, impersonating a responder, posts an answer of the responder to the question to the system. With this method, the system collects dialogue data between an unspecific person and the responder.

In addition, in Non Patent Literature 1, a persona profile as an introduction of a target person is presented to each crowdworker, and for example, two crowdworkers impersonate persons of each persona profile and have a dialogue with each other. The system collects the text of this dialogue as dialogue data.

CITATION LIST

Patent Literature
    Patent Literature 1: JP 2011-103063 A
Non Patent Literature
    Non Patent Literature 1: Saizheng Zhang, et al., "Personalizing Dialogue Agents: I have a dog, do you have pets too?", "Proceedings of the 56th Annual Meeting of the Association for Computational Linguistics", (Australia), Association for Computational Linguistics, July 2018, Volume 1: Long Papers, p. 2204-2213

SUMMARY

Technical Problem

Conventional dialogue data collection methods have difficulties in developing natural dialogues, making it difficult to collect dialogue data by such a dialogue. For example, Patent Literature 1 is a method in which a pair of a question and an answer is obtained, having difficulties in collecting dialogue data by more natural dialogue including multi-turn dialogues. In addition, Non Patent Literature 1 is a method in which persona information is forcibly discussed in a dialogue, making it difficult to establish a natural dialogue.

The present disclosure aims to provide an information processing device and an information processing method capable of easily collecting dialogue data including more natural dialogues.

Solution to Problem

For solving the problem described above, an information processing device according to one aspect of the present disclosure has a role presentation unit that presents, to a first user, a role set to the first user; an acquisition unit that acquires first data input by the first user at a time of input of the first data; a detection unit that detects, as inconsistency information, information that is included in the first data acquired by the acquisition unit and inconsistent with the role; and an inconsistency presentation unit that presents, to the first user, a message based on the inconsistency information detected from the first data by the detection unit.

BRIEF DESCRIPTION OF DRAWINGS

FIG. 1 is a schematic diagram schematically illustrating a configuration of an example of a data collection system applicable to an embodiment of the present disclosure.

FIGS. 7A and 7B are schematic diagrams illustrating an example of a warning display for inconsistency regarding description of an utterance displayed by an inconsistency display unit according to the embodiment.

FIGS. 8A and 8B are schematic diagrams illustrating an example of warning display for inconsistency related to a style of an utterance displayed by the inconsistency display unit according to the embodiment.

FIGS. 9A and 9B are schematic diagrams illustrating an example of presenting a set of persona information based on a plurality of patterns of persona information according to the embodiment.

FIGS. 10A and 10B are schematic diagrams illustrating an example of warning display for inconsistency regarding description of an utterance in Case (A) according to the embodiment.

FIGS. 11A and 11B are schematic diagrams illustrating an example of warning display for inconsistency regarding description of an utterance in Case (B) according to the embodiment.

FIGS. 13A and 13B are schematic diagrams illustrating an example of warning display for inconsistency regarding description of an utterance in Case (C) according to the embodiment.

FIGS. 14A and 14B are schematic diagrams illustrating an example of warning display for inconsistency regarding description of an utterance in Case (D) according to the embodiment.

FIG. 16 is a schematic diagram illustrating a result of inconsistency determination according to description of an utterance and persona information according to the embodiment.

FIG. 17 is a schematic diagram illustrating an example of a subjective evaluation input screen according to the embodiment.

FIGS. 19A, 19B, and 19C are schematic diagrams illustrating an example of the persona information and the dialogue data evaluated to have a low quality dialogue by a persona combination evaluation unit according to the embodiment.

FIGS. 20A, 20B, 20C, 20D, 20E, and 20F are schematic diagrams illustrating an example of a graph for presenting a basis for evaluation of a combination of persona information, presented by a persona combination evaluation unit according to the embodiment.

FIG. 21A is a flowchart illustrating an example of persona information combination evaluation processing in an initial state according to the embodiment.

FIG. 21B is a flowchart illustrating an example of persona information combination evaluation processing in a case where a sufficient system operation is performed according to the embodiment.

FIG. 23A is a schematic diagram for more specifically illustrating processing according to a first modification of the embodiment.

FIG. 23B is a schematic diagram for more specifically describing processing according to the first modification of the embodiment.

FIG. 24 is a flowchart of an example illustrating inconsistency detection processing according to the first modification of the embodiment.

FIGS. 27A and 27B are schematic diagrams illustrating a third example of image generation processing according to the second modification of the embodiment.

DESCRIPTION OF EMBODIMENTS

Figure 2:
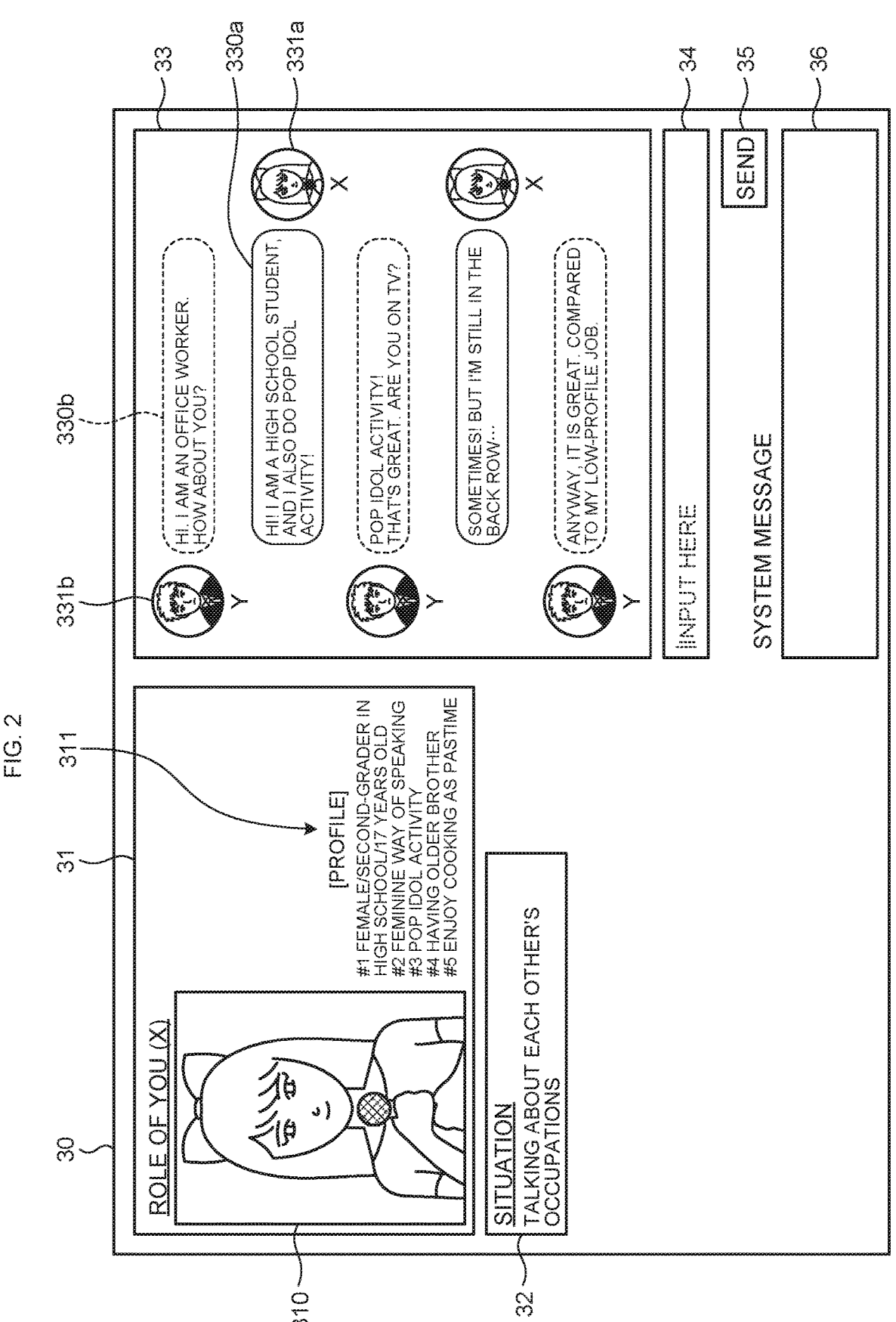
FIG. 2 is a schematic diagram illustrating an example of a dialogue screen applicable to the embodiment of the present disclosure.

Embodiments of the present disclosure will be described below in detail with reference to the drawings. In each of the following embodiments, the same parts are denoted by the same reference symbols, and a repetitive description thereof will be omitted.

Hereinafter, embodiments of the present disclosure will be described in the following order.

1. Overview of present disclosure
   1-1. Schematic configuration of data collection system according to present disclosure
   1-2. Comparison with existing technology
2. Configuration applicable to embodiment of present disclosure
3. Embodiments of present disclosure
   3-1. Inconsistency detection according to embodiment
      3-1-1. Warning display for inconsistence regarding description of utterance
      3-1-2. Warning display for inconsistency related to style of utterance
      3-1-3. Warning display for inconsistency regarding image of description of utterance
      3-1-4. Example of setting persona information of a plurality of patterns
      3-1-5. Flow of inconsistency detection processing
      3-1-6. Relationship between inconsistency determination result, and utterance and persona information
   3-2. dialogue evaluation according to embodiment
      3-2-1. Specific example of dialogue evaluation
      3-2-2. Flow of combination evaluation processing of persona information
      3-2-3. Change in persona information due to updated weight
4. First modification of embodiment of present disclosure
5. Second modification of embodiment of present disclosure

1. Overview of Present Disclosure

The present disclosure relates to collection of dialogue data formed with text data. Prior to describing the present disclosure, in order to facilitate understanding, a dialogue data collection system applicable to the present disclosure will be schematically described.

In the dialogue data collection system applicable to the present disclosure, one user in a dialogue plays a part (role) of a human presented with at least either one of an image or profile information from the system. The user has a dialogue with the other user who plays a role different from that of the one user by using text data, assuming a situation presented from the system. The dialogue data collection system collects dialogue data regarding the dialogue given by one and the other users, as a dialogue log.

The dialogue log collected in this manner can be used as, for example, training data for training a model used by the artificial intelligence in the automatic dialogue system and evaluation data. In addition, by widely recruiting users related to the dialogue work by the dialogue data collection system through a network such as the Internet, for example, it is possible to relatively easily collect the dialogue log including a large amount of dialogue data.

Note that, in order to recruit a large number of users related to dialogue works, it is possible to use a process referred to as crowdsourcing that entrusts business to an unspecified large number of users via the Internet. For example, a user who is entrusted with a dialogue as business by crowdsourcing from an operator of a dialogue data collection system is referred to as a crowdworker. Hereinafter, unless otherwise specified, the user related to the dialogue work by the dialogue data collection system is referred to as a "worker".

When dialogue data is input by a worker, the dialogue data collection system according to the present disclosure detects inconsistency of a description of the dialogue indicated in the dialogue data with a role presented to the worker, and presents the detected inconsistency to the worker. When transmitting the dialogue data to the system, the worker can correct the dialogue data in accordance with the presentation of the inconsistency. This makes it possible to improve the quality of the dialogue data and collect a higher-quality dialogue log. This can facilitate collection of the dialogue data by more natural dialogues.

Furthermore, the data collection system according to the present disclosure obtains subjective evaluation on the roles of the worker and the partner with respect to the worker who has performed the dialogue, and performs quantitative evaluation of the dialogue based on the dialogue data. The subjective evaluation and quantitative evaluation are used to evaluate the combination of an image and profile information in a role, for example, so as to improve the combination of the image and a profile sentence. With this configuration, the role to be presented to the worker can be updated to one that facilitates dialogue, making it possible to improve the quality of the dialogue data. This can facilitate collection of the dialogue data by more natural dialogues.

Figure 1:
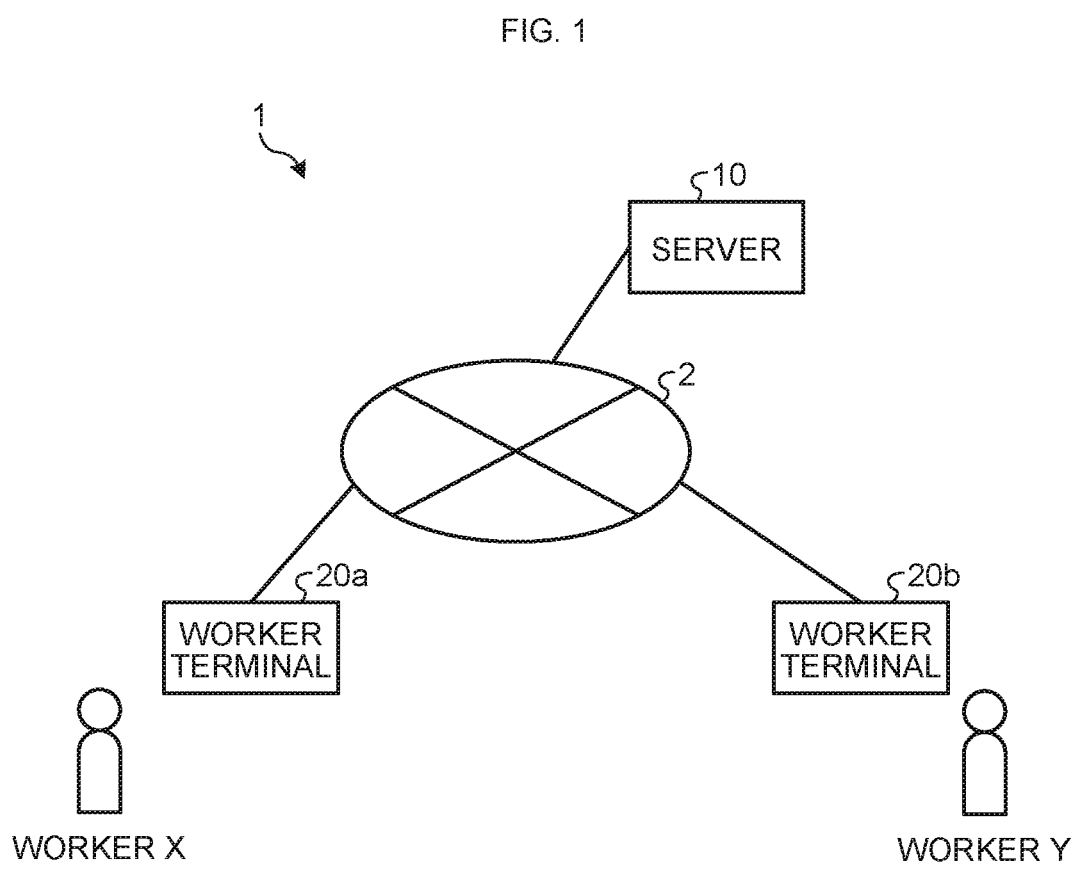

1-1. Schematic Configuration of Data Collection System According to Present Disclosure Next, a schematic configuration of a data collection system according to the present disclosure will be described with reference to FIGS. 1 and 2. Hereinafter, for example, it is assumed that the operator of the data collection system adopts two workers of a worker X and a worker Y as workers who perform a dialogue for collecting the dialogue data in the data collection system.

FIG. 1 is a schematic diagram schematically illustrating a configuration of an example of a dialogue data collection system applicable to an embodiment of the present disclosure. In FIG. 1, the dialogue data collection system 1 includes a server 10. The server 10 is communicably connected to a worker terminal 20a used by the worker X and a worker terminal 20b used by the worker Y via a network 2 such as the Internet.

The worker terminals 20a and 20b can be implemented by applying an information processing device such as a personal computer, a tablet computer, or a smartphone. Furthermore, although the server 10 is illustrated as being configured by a single information processing device in FIG. 1, the configuration is not limited to this example. For example, the server 10 may be configured in a distributed manner by a plurality of information processing devices connected to each other by a cloud network or the like.

In the data collection system, the server 10 controls the worker terminals 20a and 20b to display a dialogue screen for performing a dialogue. Here, the dialogue data collection system 1 sets a specific role to be a target of dialogue log collection for the worker X, and sets an unspecific role for the worker Y to have a dialogue with the worker X. Furthermore, the dialogue data collection system 1 sets a situation for the dialogue between the worker X and the worker Y.

FIG. 2 is a schematic diagram illustrating an example of a dialogue screen applicable to the embodiment of the present disclosure. FIG. 2 illustrates an example of a dialogue data collection screen 30 displayed on the worker terminal 20a used by the worker X. In the example of FIG. 2, the dialogue data collection screen 30 includes display regions 31 to 33 and 36, an input region 34, and a send button 35.

The display region 31 displays persona information indicating a role that has been set for the worker X. Here, the persona is a concept corresponding to a profile of a person in general terms. More specifically, the persona information of a certain person (role) includes: objective matters of the person (role) such as gender, age, and appearance; and subjective matters of the person (role) such as pastime, taste, thought, and experience. In other words, the persona information can be defined as attribute information indicating attributes of a person (role).

In the example of FIG. 2, the display region 31 includes, as the persona information set to the worker X, a display of a persona image 310 indicating appearance of the person and a display of profile information 311 indicating, using sentences, the profile of the person included in the persona image 310. In other words, the persona image 310 can be defined as an image for expressing a person or a character indicated in the persona information including the persona image 310. In this example, the persona image 310 indicates a woman holding a microphone in her hand and wearing a hair accessory. For example, an illustration image is used as the persona image 310. The image is not limited thereto, and a photograph may be used as the persona image 310. The dialogue data collection system 1 can select the persona image 310 to be presented to the worker X by a predetermined method from a plurality of prepared images, for example.

Furthermore, in the example of FIG. 2, the profile information 311 includes five items, namely, Items #1 to #5. In this example, Items #1 to #4 are objective matters of the person included in the persona image 310. Specifically, Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Note that the "occupation" referred to herein is not limited to the job for making a living, and may include activities that the person is putting effort into. Item #4 is defined to be a family structure (having an older brother) set for the person.

On the other hand, Item #5 is a subjective matter set for the person. Specifically, Item #5 is a pastime set to the person (enjoy cooking as a pastime). The dialogue data collection system 1 can use a predetermined method to select the profile information 311 to be presented to the worker X, for example, from a plurality of pieces of profile information prepared in advance.

Hereinafter, the persona image 310 and the profile information 311 may be collectively referred to as "persona information".

The display region 32 is a region displaying information indicating a dialogue situation performed by the dialogue data collection screen 30. The information indicating this situation is set by the dialogue data collection system 1, for example, and is displayed in the display region 32. In the example of the drawing, "talking about each other's occupations" is displayed in the display region 32 as the information indicating the situation. With this configuration, the workers X and Y are instructed to have a dialogue with each person between the persons set as their roles.

Note that the dialogue data collection system 1 also controls the worker terminal 20b of the worker Y to display a screen similar to the dialogue data collection screen 30 displayed on the worker terminal 20*a* of the worker X. That is, on the dialogue data collection screen 30 displayed on the worker terminal 20*b*, the persona image 310 and the profile information 311 are to be an image and a profile indicating a person who has been set as a role for the worker Y, respectively. Furthermore, in the display region 32 of the worker terminal 20*b*, the same situation as the situation presented for the worker X is displayed.

In the display region 33, the dialogue data of the worker X and the worker Y created by the dialogue is displayed in chronological order. In the example of FIG. 2, in the display region 33, time elapses from the top to the bottom, and thus, the dialogue data at the bottom is the latest data. In addition, the display region 33 is commonly displayed by the worker terminal 20*a* and the worker terminal 20*b*.

Specifically, as a result of a procedure in which the worker X inputs an utterance with the dialogue to the input region 34 and the send button 35 is operated, the utterance is posted to the dialogue data collection system 1 and displayed in the display region 33 as dialogue data 330*a* (indicated by a solid line) obtained from the worker X. The dialogue data collection system 1 registers the posted dialogue data 330*a* as a dialogue log of regarding the dialogue made by the worker X and collects the dialogue log.

Furthermore, the utterance posted by the worker Y is displayed as dialogue data 330*b* (indicated by a dotted line) obtained from the worker Y in the display region 33. The dialogue data collection system 1 can register the posted dialogue data 330*b* as a dialogue log regarding the dialogue made by the worker Y. Note that, in a case where a specific role to be a target of dialogue log collection is set for the worker X, the dialogue data collection system 1 can omit registration of the dialogue data 330*b* by the worker Y.

In the display region 33, an icon 331*a* indicating a person set as a role to the worker X is displayed adjacent to the dialogue data 330*a*, indicating that the dialogue data 330*a* is generated based on an utterance posted by the worker X. Similarly, an icon 331*b* indicating a person set as a role to the worker Y is displayed adjacent to the dialogue data 330*b*, indicating that the dialogue data 330*b* is generated based on an utterance posted by the worker X. These icons 331*a* and 331*b* may be created based on the persona image 310 of each of the workers X and Y. Furthermore, by the icons 331*a* and 331*b*, the worker X and the worker Y can obtain the appearance corresponding to the persona image 310 of the dialogue partner, for example.

Posting of utterance alternately performed by the worker X and the worker Y will form a dialogue between the worker X and the worker Y. Accordingly, the display region 33 alternately displays the dialogue data 330*a* and the dialogue data 330*b* in chronological order.

Incidentally, there can be a case where the worker X or the worker Y posts an utterance without waiting for a response from the other party. In such a case, two utterances having no chronologically sandwiched response of the other party are treated as one utterance. Furthermore, the posting by the worker X and the posting by the worker Y may be made in a manner such that one party's post is promptly followed by the other party's post as in normal dialogues, or such that the other party's post is made after a certain period of time from the one party's post.

The display region 36 is a region to display a system message from the dialogue data collection system 1. For example, when inconsistency with the profile information 311 has been detected in the description of the sentence input to the input region 34, the dialogue data collection system 1 controls to display information indicating the detected inconsistency in the display region 36. In addition, the dialogue data collection system 1 can generate a suggested correction capable of correcting the inconsistency detected in the sentence input to the input region 34 and may display the suggested correction on the display region 36.

When the dialogue between the worker X and the worker Y ends, the dialogue data collection system 1 requests the worker X and the worker Y, or the worker X alone, for example, for subjective evaluation as to whether the response by the set role was easily performed, or the response from the other party was a response facilitating the dialogue. In addition, based on the collected dialogue log, the dialogue data collection system 1 performs quantitative evaluation of the dialogue based on the dialogue data. Using these subjective evaluation and the quantitative evaluation, the dialogue data collection system 1 evaluates, for example, a combination of the persona image 310 and the profile information 311 in the role so as to improve the combination of the persona image 310 and the profile information 311.

1-2. Comparison With Existing Technology

In this manner, the dialogue data collection system 1 according to the embodiment of the present disclosure displays, on the dialogue data collection screen 30, information indicating the inconsistency with the profile information 311 detected from the description of the sentence input to the input region 34. Furthermore, the dialogue data collection system 1 improves the combination of the persona image 310 and the profile information 311 by the subjective evaluation obtained from the worker and the quantitative evaluation based on the dialogue data after the end of the dialogue. Consequently, by applying the dialogue data collection system 1 according to the embodiment of the present disclosure, the quality of the dialogue data can be improved, making is possible to collect more natural and high-quality dialogue logs.

In contrast, Patent Literature 1 uses a method in which a system presents a specific responder, a first user posts a question to the responder to the system, and a second user, impersonating a responder, posts an answer of the responder to the question to the system. With this method, the system is configured to collect dialogue data between an unspecific person and the responder.

However, Patent Literature 1 is a method of obtaining a pair of a question and an answer, having difficulties in collecting dialogue data by natural dialogues including multi-turn dialogues. In addition, in Patent Literature 1, in a case where the system presents a responder, only a person who knows in advance the target person as the responder can be a worker, greatly limiting the users who can be employed as workers.

The dialogue data collection system 1 according to the embodiment of the present disclosure detects inconsistency of an utterance input as a dialogue with respect to the profile information, and presents a suggested correction based on the detected inconsistency. Therefore, according to the dialogue data collection system 1 of the embodiment of the present disclosure, it is possible to easily collect dialogue data formed with multi-turn natural dialogues. Furthermore, the person set as the role for the worker is presented to the worker by persona information using an image and profile information, making it possible to adopt, as a worker, a user who has no prior knowledge about the person.

In contrast, in Non Patent Literature 1, a five-sentence persona profile as an introduction of a target person is presented to each worker, and for example, two workers impersonate persons of each persona profile and have a dialogue with each other. The system collects the text of this dialogue as dialogue data.

However, Non Patent Literature 1 is a method in which persona information is forcibly discussed in a dialogue, making it difficult to establish a natural dialogue. For example, Non Patent Literature 1 uses a method in which characters of a person are estimated based on a short persona profile of about five sentences, which tends to be difficult, with no scene settings. Therefore, with Non Patent Literature 1, it is difficult for a worker to bring up a topic other than the description disclosed in the persona profile.

Furthermore, Non Patent Literature 1 has little consideration of the quality of a combination of persona information indicated in a persona sentence. For example, a persona profile sometimes includes information (such as "I have a car xx from oo company" and "I have 1000 hats") that implies little information about attributes and preferences of the person. In such a case, the combination of the persona profiles becomes artificial, making it difficult to estimate detailed characters of the person introduced by the persona profile.

Since the dialogue data collection system 1 according to the embodiment of the present disclosure presents the persona information in the form of the image and the profile information to the worker, it is easy to estimate the characters of a person, and the combination of the persona information is improved by the subjective evaluation and the quantitative evaluation. Therefore, according to the dialogue data collection system 1 of the embodiment of the present disclosure, it is possible to easily collect dialogue data formed with multi-turn natural dialogues.

2. Configuration Applicable to Embodiment of Present Disclosure

Figures 3, 4:
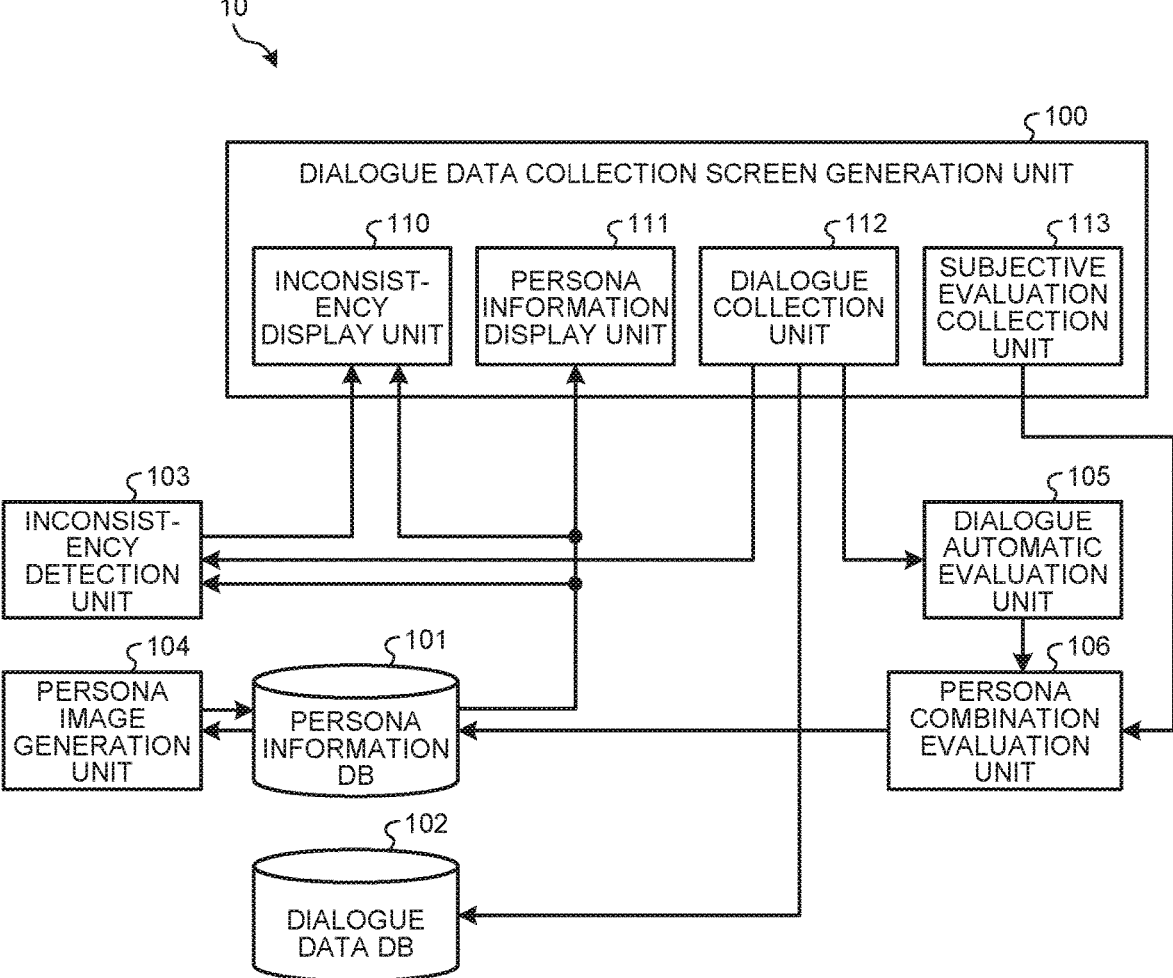
FIG. 3 is a functional block diagram of an example illustrating a server according to the embodiment of the present disclosure.
FIG. 4 is a block diagram illustrating an example of a hardware configuration of a server applicable to the embodiment.

Next, a configuration applicable to the embodiment of the present disclosure will be described. FIG. 3 is a functional block diagram of an example illustrating the server 10 according to the embodiment of the present disclosure.

In FIG. 3, the server 10 includes a dialogue data collection screen generation unit 100, a persona information database (DB) 101, a dialogue data DB 102, an inconsistency detection unit 103, a persona image generation unit 104, a dialogue automatic evaluation unit 105, and a persona combination evaluation unit 106.

Among these units, executing an information processing program according to the embodiment on a central processing unit (CPU) in the server 10 leads to achievement of configuration of the dialogue data collection screen generation unit 100, the inconsistency detection unit 103, the persona image generation unit 104, the dialogue automatic evaluation unit 105, and the persona combination evaluation unit 106. Not limited to this, some or all of the dialogue data collection screen generation unit 100, the inconsistency detection unit 103, the persona image generation unit 104, the dialogue automatic evaluation unit 105, and the persona combination evaluation unit 106 may be configured by hardware circuits that operate in cooperation with each other. Persona information DB 101 and the dialogue data DB are configured in a predetermined storage region in a storage device included in the server 10 or connected to the server 10.

The dialogue data collection screen generation unit 100 includes an inconsistency display unit 110, a persona information display unit 111, a dialogue collection unit 112, and a subjective evaluation collection unit 113. The dialogue data collection screen generation unit 100 generates display control information for displaying the dialogue data collection screen 30 illustrated in FIG. 2 in accordance with processing performed by each unit included in the dialogue data collection screen generation unit 100, and transmits the generated display control information to the worker terminals 20a and 20b. The worker terminals 20a and 20b display the dialogue data collection screen 30 on the display based on the display control information transmitted from the dialogue data collection screen generation unit 100.

Hereinafter, unless otherwise specified, processing by the dialogue data collection screen generation unit 100 including generation of the display control information for displaying the dialogue data collection screen 30, transmission of the generated information to the worker terminals 20a and 20b to display the dialogue data collection screen 30 will be described as processing by individual units included in the dialogue data collection screen generation unit 100. Furthermore, the following description assumes that a person (role) to be a target of dialogue data collection is set for the worker X who uses the worker terminal 20a, and each unit included in the server 10 executes processing on the worker terminal 20a.

The dialogue data collection screen generation unit 100 includes an inconsistency display unit 110, a persona information display unit 111, a dialogue collection unit 112, and a subjective evaluation collection unit 113.

The persona information DB 101 stores a plurality of persona images 310 and a plurality of pieces of profile information 311 as persona information. The profile information may be stored as one piece of profile information 311 as a group of a plurality of items, or may be stored for each item.

The persona information display unit 111 acquires persona information from the persona information DB 101 and controls to display the acquired persona information in the display region 31 of the dialogue data collection screen 30. The persona information display unit 111 may randomly acquire each of the persona images 310 and the profile information 311 a plurality of which are stored in the persona information DB 101, or may perform acquisition as a predetermined combination of the persona images 310 and the profile information 311. The persona information display unit 111 presents a role set as a first user to the first user and presents a role set as a second user to the second user. In other words, the persona information display unit 111 functions as a role presentation unit that presents, to the first user, the role that is set for the first user.

The dialogue collection unit 112 acquires the utterance input to the input region 34 of the dialogue data collection screen 30 at the time of the input. That is, the dialogue collection unit 112 functions as an acquisition unit that acquires first data input by the first user at the time of the input of the first data. Furthermore, the dialogue collection unit 112 acquires dialogue data of each utterance posted from the worker terminals 20a and 20b at the time of the operation on the send button 35 on the dialogue data collection screen 30.

The dialogue collection unit 112 registers the acquired dialogue data in the dialogue data DB 102 and collects a dialogue log. At this time, the dialogue collection unit 112 can associate identification information such as time information and serial numbers with the dialogue data 330a and 330b. Note that the dialogue collection unit 112 can register, in the dialogue data DB 102, only the dialogue data transmitted from the worker terminal 20a by the worker X to which the person (role) being a target of collection is set and can omit registration of the dialogue data transmitted from the worker terminal 20b by the worker Y in the dialogue data DB 102.

In addition, the dialogue collection unit 112 transmits the acquired dialogue data obtained from each of the worker X and the worker Y to the worker terminals 20a and 20b, respectively, and controls to display sentences based on the dialogue data by each of the worker X and the worker Y in chronological order in the display region 33 of the dialogue data collection screen 30 of each of the worker terminals 20a and 20b, respectively.

The inconsistency detection unit 103 detects inconsistency between the dialogue data based on the worker X acquired by the dialogue collection unit 112 and the persona information displayed by the persona information display unit 111 acquired from the persona information DB 101, and passes information indicating the detected inconsistency to the inconsistency display unit 110. The inconsistency display unit 110 transmits the information indicating the inconsistency passed from the inconsistency detection unit 103 to the worker terminal 20a used by the worker X, and controls to display the information indicating the inconsistency in the display region 36 on the dialogue data collection screen 30 of the worker terminal 20a.

That is, the inconsistency detection unit 103 functions as a detection unit that detects information inconsistent with the role included in the first data acquired by the acquisition unit, as inconsistency information. Furthermore, the inconsistency display unit 110 functions as inconsistency presentation unit that presents, to the first user, a message based on the inconsistency information detected from the first data by the detection unit.

In addition, the inconsistency display unit 110 can generate a suggested correction for the inconsistency based on the information indicating the inconsistency and the persona information displayed by the persona information display unit 111 acquired from the persona information DB 101. The inconsistency display unit 110 can transmit the generated suggested correction to the worker terminal 20a and can control to display the suggested correction in the display region 36 on the dialogue data collection screen 30 of the worker terminal 20a.

The subjective evaluation collection unit 113 generates display control information for displaying a subjective evaluation input screen (described below) for the worker X to input subjective evaluation. The subjective evaluation collection unit 113 transmits the generated display control information to the worker terminal 20a used by the worker X, and controls to display the subjective evaluation input screen on the worker terminal 20a. The worker terminal 20a transmits information indicating the subjective evaluation input to the subjective evaluation input screen to the server 10. In the server 10, the subjective evaluation collection unit 113 collects information indicating the subjective evaluation transmitted from the worker terminal 20a.

The dialogue automatic evaluation unit 105 automatically performs quantitative evaluation of the dialogue related to "naturalness of conversation" using a predetermined evaluation method based on the dialogue log collected by the dialogue collection unit 112. The dialogue automatic evaluation unit 105 can apply, as a dialogue evaluation method, a known evaluation method using an evaluation index in an ordinary dialogue system and a persona dialogue system, such as Distinct-1/2, MaxBLEU, Persona-Recall/Predict/F1, or Persona-Cover, or can also apply an original evaluation method.

The persona combination evaluation unit 106 evaluates a combination of the persona information based on at least either one of the information indicating the subjective evaluation by the worker X collected by the subjective evaluation collection unit 113 or the information indicating the quantitative evaluation automatically evaluated by the dialogue automatic evaluation unit 105. Here, the combination of the persona information includes, for example, a combination of the persona image 310 and the profile information 311 included in the persona information, or a combination of each item in the profile information 311.

Note that the subjective evaluation collection unit 113 may further acquire the subjective evaluation of the worker Y similarly to the collection of the subjective evaluation of the worker X. The persona combination evaluation unit 106 can evaluate the combination of the persona information based on at least either one of the subjective evaluation of the worker X or the subjective evaluation of the worker Y.

Based on the evaluation result, the persona combination evaluation unit 106 adjusts the weight of the combination of the persona information so as to reduce the likelihood of selecting a combination difficult for the worker X to work with. The persona combination evaluation unit 106 reflects the weight of the combination of the persona information in the persona information stored in the persona information DB 101. That is, the persona combination evaluation unit 106 functions as an evaluation unit that evaluates a combination of information included in the persona information based on the first data as well as second data input by the second user.

The persona image generation unit 104 generates a persona image 310 in the persona information, and stores the generated persona image 310 in the persona information DB 101. For example, the persona image generation unit 104 can generate a new persona image 310 based on the profile information 311 included in the persona information. Furthermore, for example, the persona image generation unit 104 can generate a new persona image 310 based on the persona image 310 stored in the persona information DB 101, for example. The persona image generation unit 104 can apply, for example, Generative Adversarial Networks (GAN) as a method of generating the new persona image 310. The method is not limited to this, and the persona image generation unit 104 can use an image selected from the persona images 310 stored in the persona information DB 101 as the new persona image 310. That is, the persona image generation unit 104 functions as an image generation unit that generates new image information based on a combination of the image information and the attribute information or a combination of the information included in the attribute information.

FIG. 4 is a block diagram illustrating an example of a hardware configuration of the server 10 applicable to the embodiment. In FIG. 4, the server 10 includes a CPU 1000, read only memory (ROM) 1001, random access memory (RAM) 1002, a storage device 1003, a data interface (I/F) 1004, and a communication I/F 1005, which are communicably connected to each other via a bus 1010.

The storage device 1003 is a nonvolatile storage medium such as a hard disk drive or flash memory. The storage device 1003 is not limited to a built-in device of the server 10, and may be externally connected to the server 10, for example.

The CPU 1000 controls the operation of the server 10 by using the RAM 1002 as work memory in accordance with programs stored in the storage device 1003 and the ROM 1001.

The data I/F 1004 is an interface for transmitting and receiving data between the server 10 and an external device. The data I/F 1004 may be implemented by applying an interface using wired communication such as a universal serial bus (USB) or an interface using wireless communication such as Bluetooth (registered trademark). The communication I/F 1005 is an interface for performing communication via the network 2.

Note that an input device such as a keyboard or a display device such as a display control unit and a display can be used as necessary for the server 10.

In the server 10, the CPU 1000 executes the information processing program for actualizing the dialogue data collection system 1 according to the embodiment, thereby configuring each of the dialogue data collection screen generation unit 100, the inconsistency detection unit 103, the persona image generation unit 104, the dialogue automatic evaluation unit 105, and the persona combination evaluation unit 106 described above as a module, for example, on a main storage region in the RAM 1002.

The information processing program can be acquired from the outside (for example, another server device (not illustrated)) via a network (not illustrated) by communication via the communication I/F 1005, for example, and can be installed on the server 10. The acquisition of the program is not limited thereto, and the information processing program may be provided by being stored in a detachable storage medium such as a compact disk (CD), a digital versatile disk (DVD), or a universal serial bus (USB) flash drive.

Figures 5, 6:
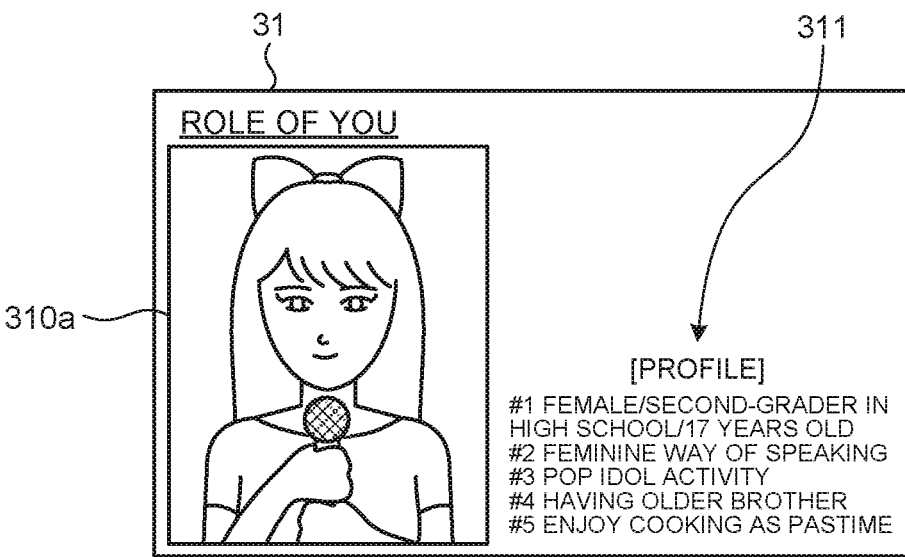
FIG. 5 is a functional block diagram of an example illustrating functions of a worker terminal according to the embodiment.
FIG. 6 is a schematic diagram illustrating an example of persona information presented to a worker X by a display region in a dialogue data collection screen according to the embodiment.

FIG. 5 is a functional block diagram of an example illustrating functions of the worker terminals 20*a* and 20*b* according to the embodiment. Since the worker terminals 20*a* and 20*b* according to the embodiment have common functions, the worker terminals 20*a* and 20*b* are collectively illustrated as the worker terminals 20 in FIG. 5.

The worker terminal 20 may have a hardware configuration like a typical computer including a CPU, ROM, RAM, a storage device, a data I/F, a communication I/F, an input device, and a display device, for example. Therefore, the description of the hardware configuration here is omitted.

The worker terminal 20 includes a control unit 200, a communication unit 201, an input unit 202, and a display unit 203. These units including the control unit 200, the communication unit 201, the input unit 202, and the display unit 203 are configured by operation of a predetermined program on the CPU, for example. Not limited to this, part or all of the control unit 200, the communication unit 201, the input unit 202, and the display unit 203 may be configured by a hardware circuit that operates in cooperation with each other.

The control unit 200 controls the overall operation of the worker terminal 20. The communication unit 201 performs communication via the network 2. The input unit 202 receives an input operation on an input device by a user (worker). The display unit 203 controls display of a screen on the display device. More specifically, the display unit 203 controls to display the dialogue data collection screen 30 on the display device in accordance with the display control information transmitted from the server 10, for example. Furthermore, the input unit 202 receives, for example, an input of character information (utterance) to the input region 34 on the dialogue data collection screen 30 displayed on the display device by the display unit 203.

Among these, the input unit 202 and the display unit 203 can be implemented by the function of a general-purpose browser application 210. For example, the server 10 transmits, to the worker terminal 20, a program for implementing the input unit 202 and the display unit 203 on the browser application 210. In the worker terminal 20, the browser application 210 configures the input unit 202 and the display unit 203 on the worker terminal 20 in accordance with the program sent from the server 10. The program to be used is not limited thereto, and the input unit 202 and the display unit 203 may be implemented by a program dedicated to the dialogue data collection system 1.

3. Embodiments of Present Disclosure

Next, an embodiment of the present disclosure will be described. In the following, in a case where the worker X and the worker Y have a dialogue, a specific person (role) to be a target of the dialogue log collection is set for the worker X, and an unspecific person (role) is set for the worker Y who has a dialogue with the worker X.

3-1. Regarding Inconsistency Detection According to Embodiment

First, inconsistency detection according to the embodiment will be described. That is, the dialogue data collection system 1 according to the embodiment detects inconsistency of the dialogue data input by the worker X with the persona information indicating the role that has been set in the worker X.

FIG. 6 is a schematic diagram illustrating an example of persona information presented to the worker X by the display region 31 in the dialogue data collection screen 30 according to the embodiment. The example of FIG. 6 corresponds to the example in the display region 31 illustrated in FIG. 2 described above, in which a persona image 310*a* is an illustration image of a woman holding a microphone in her hand and wearing a hair accessory. Furthermore, the profile information 311 includes five items, namely, Items #1 to #5. Regarding the description of Items #1 to #5, similarly to the description with reference to FIG. 2, Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined to be a family structure (having an older brother) set for the person. Furthermore, Item #5 is defined as a pastime (enjoy cooking as a pastime) set for the person.

In an initial stage of the dialogue log collection, the dialogue data collection system 1 can randomly determine a combination of the persona information, for example, a combination of the persona image 310*a* and the profile information 311. The dialogue data collection system 1 is not limited to this, and may use persona information in which a combination is determined in advance at an initial stage. When the dialogue log is accumulated in the dialogue data DB 102 with the progress of the dialogue log collection, the dialogue data collection system 1 can determine persona information to be presented to the worker X in consideration of the weight of the combination of the persona information adjusted by the persona combination evaluation unit 106.

Using the worker terminal 20*a*, the worker X has a dialogue with the worker Y on the dialogue data collection screen 30. More specifically, the worker X inputs an utterance in text data to the input region 34 on the dialogue data collection screen 30. When having determined the description to be input to the input region 34, the worker X operates the send button 35. In response to the operation on the send button 35, an utterance based on the text data input to the input region 34 is transmitted from the worker terminal 20a to the server 10. In the server 10, the dialogue collection unit 112 stores an utterance based on text data transmitted from the worker terminal 20a as the dialogue data 330a in the dialogue data DB 102, and collects the dialogue log.

In the embodiment, the dialogue between the worker X and the worker Y is limited to the dialogue using text data, and direct dialogue by voice or the like is not to be supported. At this time, it is possible to convert the description of the dialogue input by voice into text data by voice recognition processing or the like and transmit the obtained text data to the server 10.

The worker X can input a response utterance to the dialogue data 330b sent from the worker Y, or can input a first utterance of the dialogue. The worker terminal 20a transmits the utterance input to the input region 34 to the server 10 together with the input. Note that the utterance transmitted here is transmitted in a state where no operation has been performed on the send button 35.

As an example, in the worker terminal 20a, it is conceivable that the input unit 202 transmits, in succession, information indicating an input operation onto the input region 34 and text data input onto the input region 34, to the server 10 via the communication unit 201. In the server 10, the dialogue collection unit 112 sequentially configures utterances based on the information indicating the input operation transmitted in succession from the worker terminal 20 and based on the text data, and passes the configured utterances to the inconsistency detection unit 103.

In the server 10, the inconsistency detection unit 103 detects inconsistency of the utterance transmitted from the worker terminal 20 with the persona information displayed by the persona information display unit 111. The inconsistency detection unit 103 passes information indicating the detected inconsistency to the inconsistency display unit 110.

The inconsistency display unit 110 can present a warning to the worker X based on the information indicating the inconsistency passed from the inconsistency detection unit 103. At this time, the inconsistency display unit 110 presents a warning including information indicating a portion including inconsistency in the utterance and target persona information to be a basis of the inconsistency. Furthermore, the inconsistency display unit 110 can present a suggested correction for the utterance to correct the inconsistency.

3-1-1. Warning Display for Inconsistence Regarding Description of Utterance

FIGS. 7A and 7B are schematic diagrams illustrating an example of a warning display for inconsistency regarding description of an utterance displayed by the inconsistency display unit 110 according to the embodiment. FIG. 7A illustrates an example of an utterance that has been input to the input region 34 by the worker X in accordance with the persona information and the situation illustrated in FIG. 6. In this example, the utterance is "I am a third-grader in high school". The portion "third-grader in high school" is an inconsistent portion 340 which is inconsistent with "second-grader in high school" in Item #1 of the profile information 311 in the persona information. The inconsistency display unit 110 highlights the display of the inconsistent portion 340 in the input region 34 (using bold and underlined characters in the example of the drawing) to present the warning about the existence of the inconsistency.

Not limited to this, the inconsistency display unit 110 may tag the classification class of the detected inconsistency for the utterance in which the inconsistency is detected.

FIG. 7B illustrates an example of presentation, by the inconsistency display unit 110, of the basis of inconsistency regarding the inconsistent portion 340 illustrated in FIG. 7A and a suggested correction. The inconsistency display unit 110 displays a basis 351 of the inconsistency and a suggested correction 352 in the display region 36. In the example of the drawing, the inconsistency display unit 110 highlights, in a region 36a in the display region 36, the description of "second-grader in high school" in Item #1 of the profile information 311 corresponding to the description of inconsistency indicated in the inconsistent portion 340 as the basis 351 of the inconsistency.

Furthermore, the inconsistency display unit 110 generates a suggested correction 352 for the inconsistency indicated in the inconsistent portion 340. The inconsistency display unit 110 can generate the suggested correction 352 ("second-grader in high school") based on a predetermined rule, for example. In the case of the example of the drawing, for example, it is conceivable to use a rule of replacing the description of the inconsistent portion 340 based on the description presented as the basis 351 of the inconsistency. The replacement is not limited thereto, and the inconsistency display unit 110 may convert the description of the inconsistent portion 340 into the description of the suggested correction 352 based on a model trained by machine learning in a predetermined manner. In the example of the drawing, the inconsistency display unit 110 displays the generated suggested correction 352 in a region 36b immediately below the region 36a in the display region 36.

The worker X can correct the utterance input to the input region 34 in accordance with the suggested correction 352 displayed in the display region 36 (region 36b). The worker terminal 20a can transmit the utterance corrected in accordance with the suggested correction 352 to the server 10 by operating the send button 35 after the utterance input to the input region 34 in accordance with the suggested correction 352 is corrected by the worker X.

In the server 10, the dialogue collection unit 112 stores the corrected utterance transmitted from the worker terminal 20a in the dialogue data DB 102 as the dialogue data 330a by the worker X, and collects the dialogue log. Furthermore, the dialogue collection unit 112 controls to display the dialogue data 330a based on the corrected utterance in the display region 33.

Note that the worker terminal 20a can transmit an uncorrected utterance (including inconsistency) to the server 10 by operating the send button 35 without correcting the utterance input in the input region 34. Furthermore, in a case where an utterance input to the input region 34 includes a prohibited word, the dialogue collection unit 112 can display the fact in the display region 36, for example. The action is not limited thereto, and in a case where an utterance includes a prohibited word, the dialogue collection unit 112 can also control the server 10 to suppress transmission of the utterance by disabling the function of the send button 35, for example. The prohibited words are set in advance by, an operator or an administrator of the dialogue data collection system 1, for example.

3-1-2. Warning Display for Inconsistency Related to Style of Utterance

In the example of FIGS. 7A and 7B, the inconsistency detection unit 103 detects inconsistency regarding the description of the utterance. The inconsistency detection unit 103 can detect not only the description of the utterance but also the inconsistency related to the style of the utterance. For example, in a case where the style of the utterance is explicitly designated in the profile information 311, the inconsistency detection unit 103 detects inconsistency regarding the style. The style of the utterance refers to styles such as a first-person pronoun and ending of a word.

The example of the profile information 311 of FIG. 6 has a description of Item 2: "feminine way of speaking" which designates a style of conversation by which a person indicated by the persona information speaks with female word expressions. Since the designation related to the style can change depending on the relationship with the dialogue partner, a plurality of styles may be designated and described in one piece of profile information 311.

FIGS. 8A and 8B are schematic diagrams illustrating an example of warning display for inconsistency related to a style of an utterance displayed by the inconsistency display unit 110 according to the embodiment. FIG. 8A illustrates an example of an utterance that has been input to the input region 34 by the worker X in accordance with the persona information and the situation illustrated in FIG. 6. In this example, the utterance is "I am a third-grader in high school" (original Japanese: ORE WA KOUKOU SAN-NENSEI DA, in which "ORE" meaning "I" typically used by males begins the sentence and "DA" meaning "am" being a blunt male-like expression ends the sentence). In this sentence, the first-person pronoun "ORE" and the ending word "DA" correspond to inconsistent portions 341*a* and 341*b* respectively, which are inconsistent with "feminine way of speaking" in Item #2 of the profile information 311 in the persona information. The inconsistency display unit 110 highlights the display of the inconsistent portions 341*a* and 341*b* in the input region 34 (using bold and underlined characters in the example of the drawing) to present the warning about the existence of the inconsistency.

FIG. 8B illustrates an example of presentation, by the inconsistency display unit 110, of the basis of inconsistency regarding the inconsistent portions 341*a* and 341*b* illustrated in FIG. 8A and a suggested correction. The inconsistency display unit 110 controls to display a basis 353 of inconsistency and suggested corrections 354*a* and 354*b* in the display region 36. In the example of the drawing, the inconsistency display unit 110 highlights, in a region 36*a* in the display region 36, the description of "feminine way of speaking" in Item #2 of the profile information 311 corresponding to the inconsistency description indicated in the inconsistent portions 341*a* and 341*b* as the basis 353 of the inconsistency.

In addition, the inconsistency display unit 110 generates the suggested corrections 354*a* and 354*b* based on a predetermined rule or a model trained by machine learning for the inconsistency indicated by the inconsistent portion 340. In the example of the drawing, the inconsistency display unit 110 displays the generated suggested corrections 354*a* and 354*b* in a region 36*b* immediately below the region 36*a* in the display region 36. Also in this case, similarly to the above description, the worker X can correct the utterance that has been input to the input region 34 in accordance with the suggested corrections 354*a* and 354*b* displayed in the display region 36 (region 36*b*) and can transmit the corrected utterance to the server 10.

3-1-3. Warning Display for Inconsistency Regarding Image of Description of Utterance The inconsistency detection unit 103 can detect not only the profile information 311 in the persona information but also the inconsistency of the utterance with the persona image 310*a*. In a case where the persona image 310*a* is associated with meta-information related to the persona image 310*a*, the inconsistency detection unit 103 can detect inconsistency of the utterance with the meta-information. The detection is not limited thereto, and the inconsistency detection unit 103 can also perform image recognition on the persona image 310*a* and detect the inconsistency of the utterance based on a result of the image recognition.

As an example, the inconsistency detection unit 103 detects inconsistency of the utterance with the persona image 310*a* in a case where a person with black hair appears in the persona image 310*a* while the utterance is "My hair is brown" or the like. In response to the inconsistency detection result, the inconsistency display unit 110 displays a warning indicating that the utterance is inconsistent with the persona image 310*a* on the display region 36 of the dialogue data collection screen 30. Note that a method of performing image recognition on the persona image 310*a* displayed as the persona information is not particularly limited.

Similarly to the above, the inconsistency display unit 110 can generate a suggested correction to the detected inconsistency based on a predetermined rule or a model trained by machine learning. Also in this case, similarly to the above description, the worker X can correct the utterance that has been input to the input region 34 in accordance with the suggested correction displayed in the display region 36 and can transmit the corrected utterance to the server 10.

3-1-4. Example of Setting Persona Information of a Plurality of Patterns

Next, the following is an exemplary case where setting of a plurality of patterns of persona information is performed as a set of persona information for one person (referred to as person A) played by the worker X. For example, it is conceivable that various persona information is associated with the person A in accordance with the situation (work place, home, etc.).

Figure 9A:
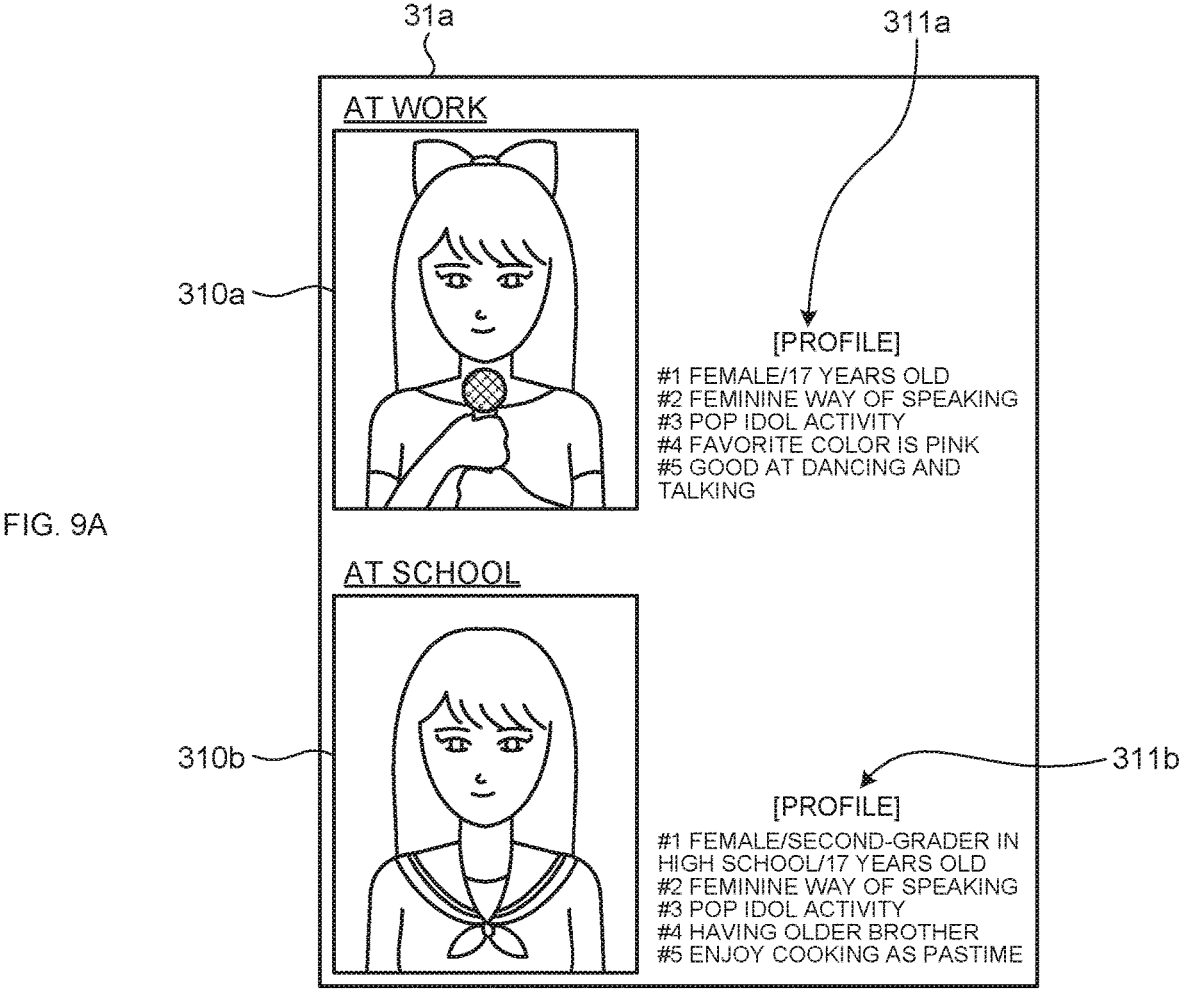

FIGS. 9A and 9B are schematic diagrams illustrating an example of presenting a set of persona information based on a plurality of patterns of persona information according to the embodiment. FIG. 9A illustrates how persona information of two patterns, namely, the first persona information and the second persona information, is displayed in a display region 31*a* of the dialogue data collection screen 30. The first persona information is formed with a combination of the persona image 310*a* and profile information 311*a*. The second persona information is formed with a combination of a persona image 310*b* and profile information 311*b*.

The first persona information is set as information "at work" of the person A, in which the persona image 310*a* is an illustration image of a woman holding a microphone in her hand and wearing a hair accessory, similarly to FIG. 6. The profile information 311*a* includes five items, namely, Items #1 to #5. Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined as a preference (favorite color is pink) set to the person. Furthermore, Item #5 is defined as a special skill (good at dancing and talking) set for the person.

The second persona information is set as information of the person A "at school", in which the persona image 310*b* is an illustration image of a woman wearing a high school uniform and not wearing hair accessories. The profile information 311b includes five items, namely, Items #1 to #5. Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined to be a family structure (having an older brother) set for the person. Furthermore, Item #5 is defined as a pastime (enjoy cooking as a pastime) set for the person.

One situation is presented for the dialogue with the person A for which the first persona information and the second persona information are set. In this example, as illustrated in FIG. 9B, a situation of "Talking at school with friends about family" is presented. The worker X selects appropriate persona information from the first and second persona information in accordance with this situation, and has a dialogue with the worker Y.

In this case, in a case where the utterance of the worker X corresponds to any of the following four cases (A) to (D), a warning related to inconsistency is issued.

(A) Having inconsistency in persona information common to all patterns.

(B) Having inconsistency between presented situation and the selected persona information.

(C) Mentioning persona information of a certain pattern when the presented situation does not depend on a specific pattern. In this case, the conflict is notified to prompt confirmation.

(D) Mixture of pieces of persona information independent from each other in different patterns.

FIGS. 10A and 10B are schematic diagrams illustrating an example of warning display for inconsistency regarding description of an utterance in above Case (A) according to the embodiment. It is assumed that the first and second persona information illustrated in FIG. 9A is presented with the situation illustrated in the FIG. 9B to the worker X.

FIG. 10A illustrates an example of the utterance input to the input region 34 by the worker X. In this example, the utterance is "I am 18 years old.", and the portion of "18 years old" is an inconsistent portion 342, which is inconsistent with "17 years old" in Item #1, in the profile information 311a and 311b in the first and second persona information. The description of "17 years old" in Item #1 is persona information common to the profile information 311a and 311b. The inconsistency display unit 110 highlights the display of the inconsistent portion 342 in the input region 34 (using bold and underlined characters in the example of the drawing) to present the warning about the existence of the inconsistency.

FIG. 10B illustrates an example of presentation, by the inconsistency display unit 110, of the basis of the inconsistency regarding the inconsistent portion 342 illustrated in FIG. 10A and a suggested correction. The inconsistency display unit 110 displays a basis 355 of the inconsistency and a suggested correction 356 in the display region 36. In the example of FIGS. 10A and 10B, the inconsistency display unit 110 highlights, in a region 36a in the display region 36, the description of "17 years old" in Item #1 of the profile information 311 corresponding to the inconsistency description indicated in the inconsistent portion 342 as the basis 355 of the inconsistency.

Furthermore, the inconsistency display unit 110 generates a suggested correction 356 ("17 years old") for the inconsistency indicated by the inconsistent portion 342. In the example of the drawing, the inconsistency display unit 110 displays the generated suggested correction 356 in a region 36b immediately below the region 36a in the display region 36.

FIGS. 11A and 11B are schematic diagrams illustrating an example of warning display for inconsistency regarding description of an utterance in above Case (B) according to the embodiment. It is assumed that the first and second persona information illustrated in FIG. 9A is presented with the situation illustrated in the FIG. 9B to the worker X.

FIG. 11A illustrates an example of the utterance input to the input region 34 by the worker X. In this example, the utterance is "I am good at dancing and talking", and a warning is issued regarding a portion of "dancing and talking" as an inconsistent portion 343.

That is, as illustrated in the FIG. 9B, a conversation with a "friend" at "school" is presented as the situation, and thus, the second persona information of "at school" should be selected as the persona information. However, the utterance is considered to be made with reference to "good at dancing and talking" of Item #5 in the first persona information, and thus is inconsistent with the presented situation. Therefore, the inconsistency display unit 110 highlights the display of the portion of "dancing and talking" in the input region 34 as the inconsistent portion 343 (using bold and underlined characters in the example of FIGS. 11A and 11B) to present the warning about the existence of the inconsistency.

FIG. 11B illustrates an example of presentation, by the inconsistency display unit 110, of the basis of the inconsistency regarding the inconsistent portion 343 illustrated in FIG. 11A and a suggested correction. The inconsistency display unit 110 displays a basis 357 of the inconsistency and a suggested correction 358 in the display region 36. In the example of the drawing, the inconsistency display unit 110 highlights, in a region 36g in the display region 36, that the description indicated by the inconsistent portion 343 is inconsistent with "situation" as the basis 357 of the inconsistency.

In addition, the inconsistency display unit 110 generates a suggested correction 358 ("having an older brother") for the inconsistency indicated in the inconsistent portion 343. In the example of the drawing, the inconsistency display unit 110 displays the generated suggested correction 358 in a region 36h immediately below the region 36g in the display region 36.

An example of the warning display for the inconsistency regarding the description of the utterance in case (C) described above will be described with reference to FIGS. 12A, 12B, 13A, and 13B.

Figures 12A, 12B:
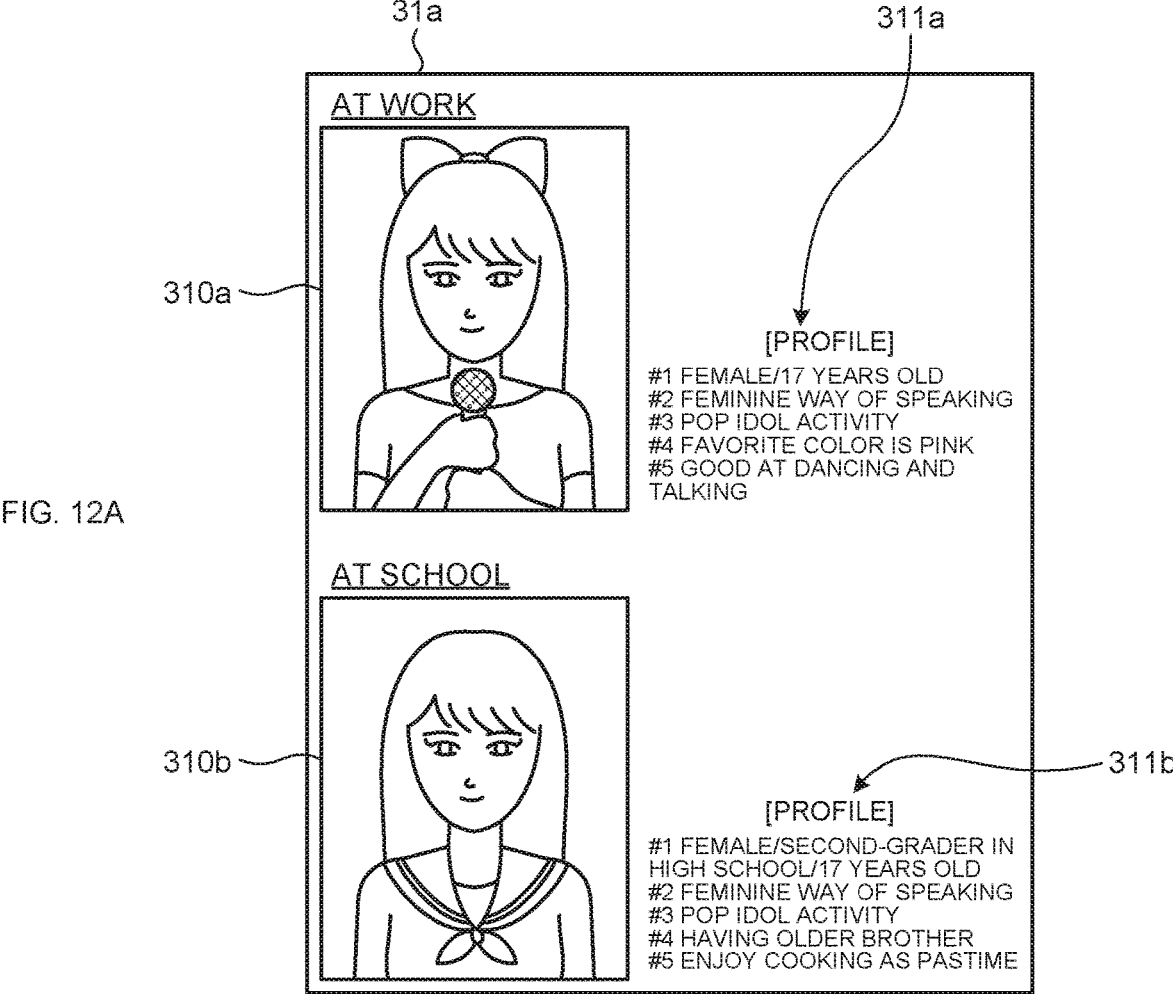
FIGS. 12A and 12B are schematic diagrams illustrating an example of presenting a set of persona information based on a plurality of patterns of persona information according to the embodiment.

FIGS. 12A and 12B are schematic diagrams illustrating an example of presenting a set of persona information based on a plurality of patterns of persona information according to the embodiment. FIG. 12A illustrates how persona information of two patterns, namely, the first persona information and the second persona information, is displayed in the display region 31a of the dialogue data collection screen 30. Since the first persona information and the second persona information are the same as the first and second persona information described with reference to FIGS. 9A and 9B, the description thereof is omitted here.

One situation is presented for the dialogue with the person A for which the first persona information and the second persona information are set. As illustrated in FIG. 12B, this example presents a situation of "talking about special skills". The situation of "talking about special skills" does not depend on the first or second persona information illustrated in FIG. 12A.

FIGS. 13A and 13B are schematic diagrams illustrating an example of warning display for inconsistency regarding description of an utterance in above Case (C) according to the embodiment. It is assumed that the first and second persona information illustrated in FIG. 12A is presented with the situation illustrated in FIG. 12B to the worker X.

FIG. 13A illustrates an example of the utterance input to the input region 34 by the worker X. In this example, the utterance is "I am good at cooking.", and the portion of "cooking" corresponds to "good at cooking" in Item #5 of the profile information 311*b* in the second persona information, and this utterance is considered to have mentioned the second persona information. The inconsistency display unit 110 highlights the display of a mentioned portion 344 in the input region 34 (using bold and underline in the example of the drawing).

FIG. 13B illustrates an example of presentation of a basis regarding the mentioned portion 344 illustrated in FIG. 13A by the inconsistency display unit 110. In the example of the drawing, the inconsistency display unit 110 presents, to the display region 36, that a portion mentioned regarding the second persona information ("at school") has been detected in a situation that does not depend on the first or second persona information.

FIGS. 13A and 13B are schematic diagrams illustrating an example of warning display for inconsistency regarding description of an utterance in above Case (C) according to the embodiment. It is assumed that the first and second persona information illustrated in FIG. 12A is presented with the situation illustrated in the FIG. 12B to the worker X.

FIG. 13A illustrates an example of the utterance input to the input region 34 by the worker X. In this example, the utterance is "I am good at cooking.", and the portion of "cooking" corresponds to "good at cooking" in Item #5 of the profile information 311*b* in the second persona information, and this utterance is considered to have mentioned the second persona information. The inconsistency display unit 110 highlights the display of a mentioned portion 344 in the input region 34 (using bold and underline in the example of the drawing).

FIG. 13B illustrates an example of presentation of a basis regarding the mentioned portion 344 illustrated in FIG. 13A by the inconsistency display unit 110. In the example of the drawing, the inconsistency display unit 110 presents, to the display region 36, that a portion mentioned regarding the second persona information ("at school") has been detected in a situation that does not depend on the first or second persona information.

FIGS. 14A and 14B are schematic diagrams illustrating an example of warning display for inconsistency regarding description of an utterance in above Case (D) according to the embodiment. It is assumed that the first and second persona information illustrated in FIG. 12A is presented with the situation illustrated in FIG. 12B to the worker X.

FIG. 14A illustrates an example of the utterance input to the input region 34 by the worker X. In this example, the utterance is "I am good at cooking and dancing", and a warning is issued for the portion of "cooking and dancing" as a mixed portion 345 of different pieces of persona information.

That is, as illustrated in FIG. 12A, the first persona information includes the description of "Good at dancing" as Item #5 in the profile information 311*a*. On the other hand, the second persona information includes the description "Enjoy cooking as a pastime" as Item #5 of the profile information 311*b*. These "good at dancing" and "enjoy cooking as a pastime" are persona information independent of each other.

FIG. 14B illustrates an example of presentation, by inconsistency display unit 110, of the basis and the suggested correction regarding the mixed portion 345 illustrated in FIG. 14A. In order to reveal the basis of mixed portion 345, as illustrated in FIG. 14B, the inconsistency display unit 110 presents, in the region 36*a* of the display region 36, the state in which information 360 of the first persona information and information 361 of the second persona information are mixed.

Furthermore, the inconsistency display unit 110 generates a suggested correction 362 ("cooking") for the description in the mixed portion 345. In the example of the drawing, the inconsistency display unit 110 generates the suggested correction 362 based on the second persona information, and displays the suggested correction 362 in the region 36*b* immediately below the region 36*a* in the display region 36.

Note that the dialogue data collection system 1 can hold a history of results of inconsistency detection described with reference to FIGS. 6, 7A, 7B, 8A, 8B, 9A, 9B, 10A, 10B, 11A, 11B, 12A, 12B, 13A, 13B, 14A, and 14B. The dialogue data collection system 1 can give feedback on the setting of the persona information that is likely to include an inconsistency to the operator who uses the dialogue data collection system 1, for example, based on the history of the results of inconsistency detection.

3-1-5. Flow of Inconsistency Detection Processing

Figure 15:
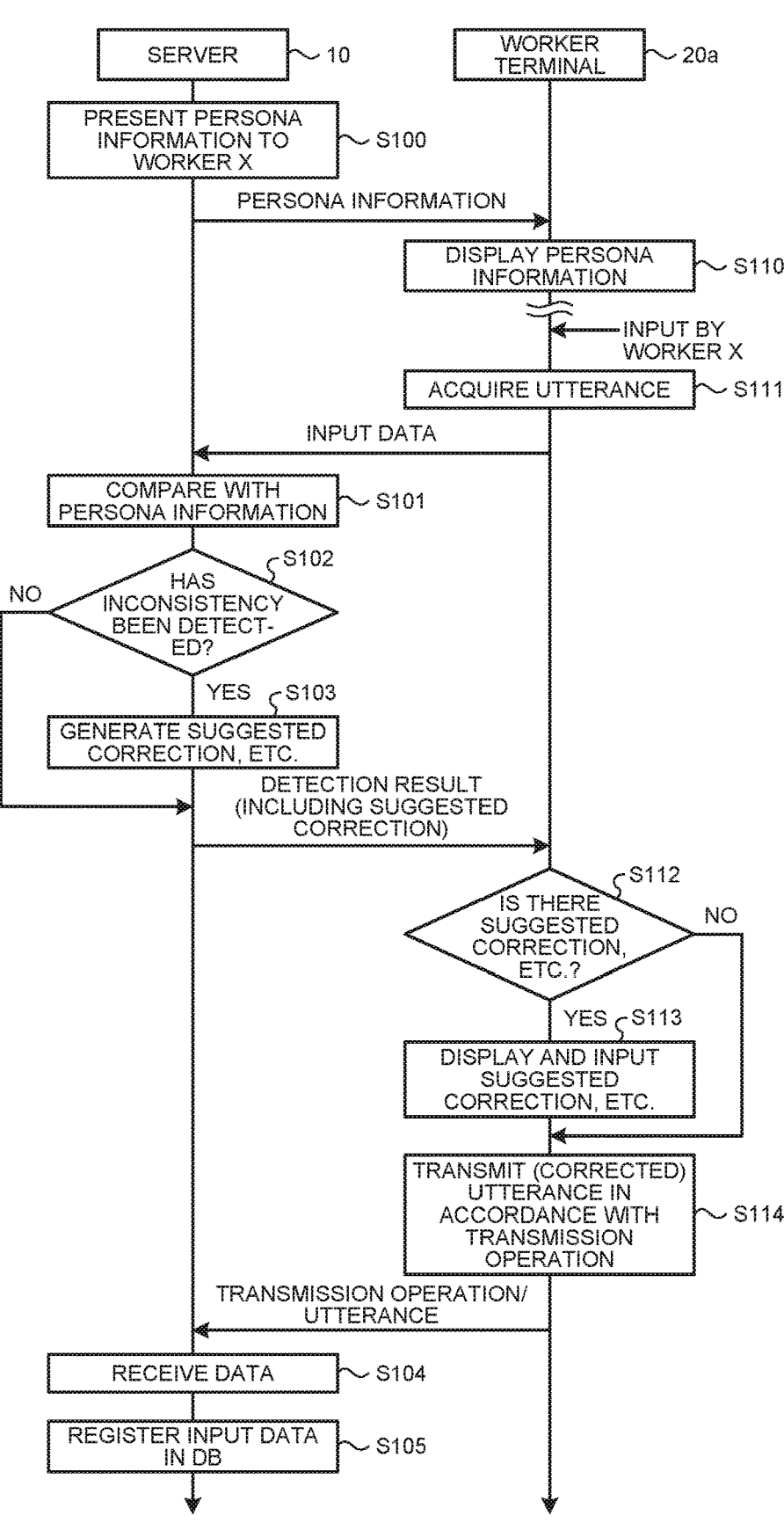
FIG. 15 is a flowchart illustrating an example of inconsistency detection processing according to the embodiment.

FIG. 15 is a flowchart illustrating an example of inconsistency detection processing according to the embodiment. The flowchart of FIG. 15 focuses on processing between the server 10 and the worker terminal 20*a* used by the worker X.

In Step S100, the server 10 acquires persona information randomly or in a predetermined combination from the persona information DB 101 by the persona information display unit 111, and transmits the acquired persona information to the worker terminal 20*a* to present the persona information to the worker X. In Step S110, the worker terminal 20*a* displays the persona information transmitted from the server 10 using the display unit 203.

In practice, the server 10 transmits, to the worker terminal 20*a*, display control information for displaying the dialogue data collection screen 30 including the acquired persona information and the information indicating the situation, for example. The worker terminal 20*a* uses the display unit 203 to display the dialogue data collection screen 30 on a display or the like in accordance with the display control information transmitted from the server 10. The processing related to the display in the worker terminal 20*a* is performed by updating the dialogue data collection screen 30 in the server 10 except for the input processing regarding the input region 34, but here, the description will be given assuming that the processing is to be executed in the worker terminal 20*a*.

The worker X inputs the utterance into the input region 34 of the dialogue data collection screen 30 displayed on the worker terminal 20*a*, and the input unit 202 acquires the utterance (Step S111). The worker terminal 20*a* transmits the acquired utterance to the server 10. The utterance is received by the server 10 and acquired by the dialogue collection unit 112.

In Step S101, the server 10 compares the utterance acquired by the dialogue collection unit 112 with the persona information presented to the worker X in Step S100 by the inconsistency detection unit 103, and detects the inconsistency of the utterance with the persona information. In the next Step S102, the server 10 determines whether inconsistency has been detected in Step S101 by the inconsistency display unit 110. When determined that inconsistency has been detected (Step S102, "Yes"), the processing proceeds to Step S103.

In contrast, when determined that no inconsistency has been detected in Step S102 (Step S102, "No"), the server 10 skips the processing of Step S103.

In Step S103, the server 10 uses the inconsistency display unit 110 to generate a suggested correction or the like for the detected inconsistency.

After the processing of Step S103, or in a case where Step S102 has detected no inconsistency and Step S103 has been skipped, the server 10 transmits information including a detection result of the inconsistency, as well as the suggested correction created, if any, to the worker terminal 20a.

In Step S112, the worker terminal 20a determines whether the information transmitted from the server 10 includes a suggested correction or the like. When determined that the information includes the suggested correction or the like (Step S112, "Yes"), the processing proceeds to Step S113. In contrast, when the worker terminal 20a determines in Step S112 that the suggested correction or the like is not included (Step S112, "No"), the processing of Step S113 is skipped.

In Step S113, the worker terminal 20a uses the display unit 203 to display the suggested correction or the like transmitted from the server 10 in the display region 36 of the dialogue data collection screen 30. The worker X corrects the utterance displayed in the input region 34 as necessary based on the displayed suggested correction or the like.

In the next Step S114, in response to the operation on the send button 35, the worker terminal 20a transmits the utterance input in the input region 34 to the server 10. In a case where the utterance has been corrected in Step S113, the corrected utterance is transmitted to the server 10. In addition, the worker terminal 20a transmits, together with the utterance, transmission operation information indicating that the send button 35 has been operated, to the server 10.

Here, the worker terminal 20a perform transmission of the utterance to the server 10 triggered by an operation on the send button 35, but the transmission is not limited to this example. For example, the worker terminal 20a may perform the transmission of the utterance triggered by a predetermined operation (for example, a combination operation with a special key) in the input region 34.

In Step S104, the server 10 receives the utterance and the transmission operation information transmitted from the worker terminal 20a. In the next Step S105, the server 10 registers the received utterance in the dialogue data DB 102 as the dialogue data 330a regarding the worker X by the dialogue collection unit 112, and collects the dialogue log. That is, by the transmission of the transmission operation information together with the utterance from the worker terminal 20a, the server 10 can determine that the utterance can be registered in the dialogue data DB 102 as a confirmed utterance including correction.

3-1-6. Relationship Between Inconsistency Determination Result, and Utterance and Persona Information Next, a relationship between the inconsistency determination result and the utterance and the persona information according to the embodiment will be described. The result of the inconsistency determination obtained by the inconsistency detection unit 103 varies depending on whether there is an inclusion relation between the utterance and the persona information and whether descriptions (values) of the utterance and the persona information are unique.

FIG. 16 is a schematic diagram illustrating a result of inconsistency determination according to the description of an utterance and persona information according to the embodiment. In FIG. 16, each column indicates "presence of semantic inclusion relation", "partial presence of semantic inclusion relation", and "absence of semantic inclusion relation" for the inclusion relations between the utterance and the persona information. In addition, each row indicates "having a unique value" and "having a plurality of values" for the descriptions (values) of the utterance and the persona information.

In FIG. 16, the determination of Class (1) is No warning issued for the case where there is a semantic inclusion relation and where the description (value) is unique, and the determination of Class (2) is also No warning issued for the case where there is a semantic inclusion relation and capable of taking a plurality of descriptions (values). The determination of Class (3) is warning issued for the case where there is a partial semantic inclusion relation and the description (value) is unique, and the determination of Class (4) is warning issued for the case where there is a partial semantic inclusion relation and capable of taking a plurality of descriptions (values). The determination of Class (5) is warning issued for the case where there is no semantic inclusion relation and where the description (value) is unique, and the determination of Class (6) is also warning issued for the case where there is no semantic inclusion relation and capable of taking a plurality of descriptions (values).

The determinations in Class (1) to Class (6) of FIG. 16 will be described using specific examples.

Class (1): Determination When There is a Semantic Inclusion Relation and the Description (Value) is unique.

For example, in a case where the profile information in the persona information includes "17 years old, female" and the statement is "I am a 17 year old woman", there is a semantic inclusion relation between the profile information and the statement, and the profile information has a unique value. In this case, the inconsistency detection unit 103 determines that the statement has no inconsistency with the profile information, and no warning is issued.

Class (2): Determination When There is a Semantic Inclusion Relation and the Description (Value) can be Obtained in Plurality For example, in a case where the profile information in the persona information includes a description of "enjoy cooking as a pastime" and a statement is "My pastime is cooking", there is a semantic inclusion relation between the profile information and the statement. Furthermore, the profile information can take a plurality of values in terms of "cooking". In this case, the inconsistency detection unit 103 determines that the statement has no inconsistency with the profile information, and no warning is issued.

Class (3): Determination When There is a Partial Semantic Inclusion Relation and the Description (Value) is Unique.

For example, in a case where the profile information in the persona information includes a description of "left-handed" and a statement is "Basically left-handed, but use right hand only when writing", there is a partial semantic inclusion relation between the profile information and the statement ("left-handed"). In this example, the principle is "left-handed", which is unique in value. Furthermore, the statement contradicts the principle only in a specific case (when writing). In this case, although the inconsistency detection unit 103 detects no inconsistency, the inconsistency display unit 110 can issue a warning.

Class (4): Determination When There is a Partial Semantic Inclusion Relation and the Description (Value) can be Obtained in Plurality For example, in a case where the profile information in the persona information includes a description of "enjoy cooking as a pastime" and a statement is "One exception is, I'm not good at making fried rice", there is a partial semantic inclusion relation between the profile information and the statement (that is, "(enjoy cooking as a pastime) with one exception of not being good at making fried rice"). In this example, the principle is "enjoy cooking as a pastime", and the "pastime" can take a plurality of values. The statement contradicts the principle only in a specific case (when waking fried rice). In this case, although the inconsistency detection unit 103 detects no inconsistency, the inconsistency display unit 110 can issue a warning.

Class (5): Determination When There is no Semantic Inclusion Relation and the Description (Value) is Unique.

For example, in a case where the profile information in the persona information includes a description of "high school student" and a statement is "I am in college", there is no semantic inclusion relation between the profile information and the statement. In this example, the value of "high school student" described in the profile information is unique. The inconsistency detection unit 103 detects inconsistency when there is no semantic inclusion relation between the statement and the persona information that can take only a unique value. In this case, the inconsistency display unit 110 issues a warning about the presence of inconsistency.

(6) Determination When There is no Semantic Inclusion Relation and the Description (Value) can be Obtained in Plurality For example, in a case where the profile information in the persona information includes a description of "enjoy cooking as a pastime" and a statement is "My pastime is cooking", there is no semantic inclusion relation between the profile information and the statement. In this example, "enjoy cooking as a pastime" in principle, and the statement says, "I also enjoy sports as a pastime". The "pastime" is an item that can take a plurality of values. Therefore, although no inconsistency is detected by the inconsistency detection unit 103, the inconsistency display unit 110 can issue a warning.

The inconsistency detection unit 103 performs inconsistency determination by conducting classification into Classes (1) to (6) described above based on the persona information and the statement. Therefore, the presence or absence of the warning and descriptions of the warning message according to the result of the inconsistency detection can be varied for each system.

3-2. Dialogue Evaluation According to Embodiment

Next, dialogue evaluation according to the embodiment will be described. The embodiment includes execution of subjective evaluation of evaluating "easiness of dialogue" by a worker and quantitative evaluation of evaluating the quality of dialogue data. The embodiment uses the subjective evaluation and the quantitative evaluation and give a low weight in combination to the persona information that can be determined to be a factor of low-quality dialogue data to reduce the likelihood of selecting the persona information.

First, subjective evaluation according to the embodiment will be described. After the dialogue between the worker X and the worker Y ends, the dialogue data collection system 1 according to the embodiment presents a subjective evaluation input screen to the worker X and requests the worker X to input a subjective evaluation, for example. Using the subjective evaluation input screen, the dialogue data collection system 1 requests the worker X to evaluate on two points, that is, whether creating the response was easy for the worker X with the role given to the worker X, and whether creating a response to a response from the worker Y was easy.

FIG. 17 is a schematic diagram illustrating an example of a subjective evaluation input screen 40 according to the embodiment. In the server 10, the subjective evaluation collection unit 113 generates display control information for displaying the subjective evaluation input screen 40, and transmits the generated display control information to the worker terminal 20a. The worker terminal 20a causes the display unit 203 to display the subjective evaluation input screen 40 in accordance with the display control information transmitted from the server 10.

In FIG. 17, the subjective evaluation input screen 40 includes a dialogue display region 400, an evaluation input region 41, and a send button 42.

The dialogue display region 400 is a region in which information regarding the dialogue to be evaluated is displayed. The dialogue display region 400 includes: a display region 31 that displays the persona information including the persona image 310 and the profile information 311; a display region 32 that displays the situation; and a display region 401 that displays the dialogue data 330a and 330b to be evaluated. The display region 401 is a region that displays the dialogue data 330a and 330b to be evaluated, which have been extracted from the dialogue log information stored in the dialogue data DB 102, for example. By operating a scroll bar 402 in the example of the drawing, the dialogue data 330a and 330b protruding from the screen can be displayed in the display region 401.

The evaluation input region 41 includes an input region 410a and an input region 410b.

The input region 410a is a region for inputting by the worker X whether creating a response was easy as the role of the worker X. More specifically, the input region 410a includes an input means for inputting a difficulty level at the time when the worker X created a response as a person (role) assigned to the worker X. In the example of the figure, the response creation difficulty level by the worker X is input in five levels from "very difficult to create" at Level [1] having the highest creation difficulty level to "very easy to create" at level [5] having the lowest creation difficulty level. In the example of the figure, the worker X refers to the descriptions displayed in the dialogue display region 400, for example, and exclusively inputs one of the Levels [1] to [5] using a check box 411a as an input means.

The input region 410b is a region for inputting whether it was easy to create a response to the response from the worker Y. In the example of the figure, the worker X evaluates the dialogue with the worker Y in the input region 410b, thereby evaluating whether it has been easy to create a response to the response from the worker Y. More specifically, the input region 410b includes an input means for the worker X to input an easiness of dialogue for the response from the worker Y. In the example illustrated in the figure, the easiness of dialogue with the worker Y by the worker X is input in five levels of "Very difficult to have a conversation" in Level [1] having the lowest easiness of dialogue and "very easy to have a conversation" in Level [5] having the highest easiness of dialogue. In the example of the figure, the worker X refers to the descriptions displayed in the dialogue display region 400, for example, and exclusively inputs one of the Levels [1] to [5] using a check box 411b as an input means.

The send button 42 is used to transmit a result of input to the input regions 410a and 410b to the server 10 as information indicating subjective evaluation by the worker X. In the server 10, the subjective evaluation collection unit 113 acquires information indicating the subjective evaluation transmitted from the worker terminal 20a. The subjective evaluation collection unit 113 calculates a score based on the acquired information indicating the subjective evaluation, and passes information indicating the calculated score to the persona combination evaluation unit 106.

In the server 10, the dialogue automatic evaluation unit 105 acquires the dialogue data 330a and 330b to be evaluated from the dialogue log information stored in the dialogue data DB 102. Based on the acquired dialogue data 330a and 330b, the dialogue automatic evaluation unit 105 performs quantitative evaluation of the dialogue using an evaluation index by a known evaluation method such as Distinct-1/2, MaxBLEU, Persona-Recall/Predict/F1, or Persona-Cover as described above. Methods to be used are not limited thereto, and the dialogue automatic evaluation unit 105 can also perform quantitative evaluation of the dialogue using an original evaluation method.

In the embodiment, the dialogue automatic evaluation unit 105 performs quantitative evaluation of the dialogue based on whether the number of times of topic changes in the dialogue is not too many (whether the transition of the topic is not sudden) or whether there is no logical gap in the dialogue (whether the conversation makes sense), for example. The dialogue automatic evaluation unit 105 calculates a score based on the result of a quantitative table of the dialogue, and passes information indicating the calculated score to the persona combination evaluation unit 106.

The persona combination evaluation unit 106 determines the quality of the dialogue between the worker X and the worker Y based on the score related to the subjective evaluation passed from the subjective evaluation collection unit 113 and the score related to the quantitative evaluation passed from the dialogue automatic evaluation unit 105. Furthermore, the persona combination evaluation unit 106 evaluates a combination of the persona information based on the score related to the subjective evaluation and the score related to the quantitative evaluation, and weights the combination.

Note that FIG. 17 illustrates that the persona image 310 and the profile information 311 are collectively evaluated, but an evaluation style is not limited to this example. For example, it is also allowable to evaluate individual items of the persona image 310 and the profile information 311.

3-2-1. Specific Example of Dialogue Evaluation

Figure 18A:
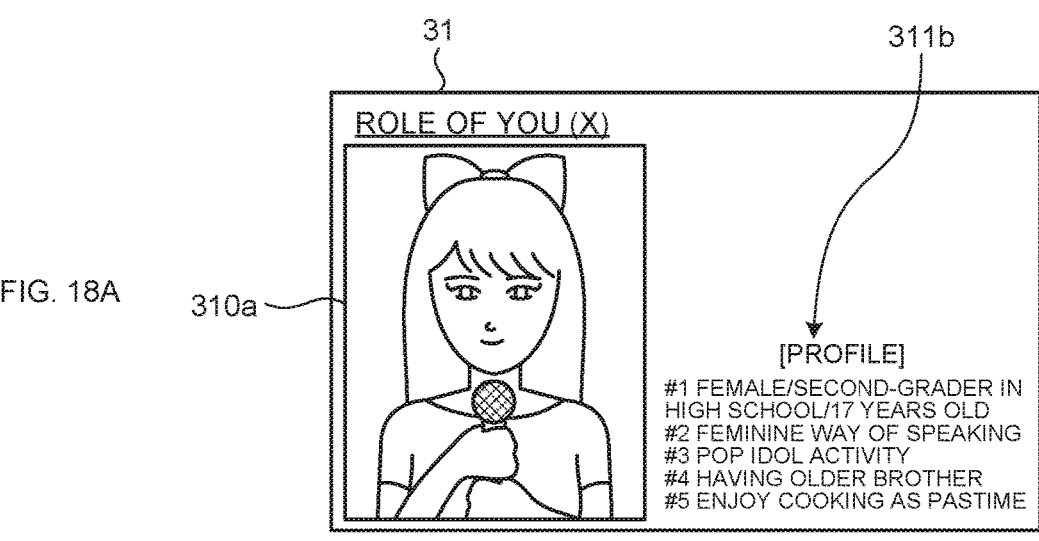
FIGS. 18A, 18B, and 18C are schematic diagrams illustrating an example of the persona information and the dialogue data evaluated to have a high quality dialogue by a persona combination evaluation unit according to the embodiment.
Figure 18B:
Figure 18C:
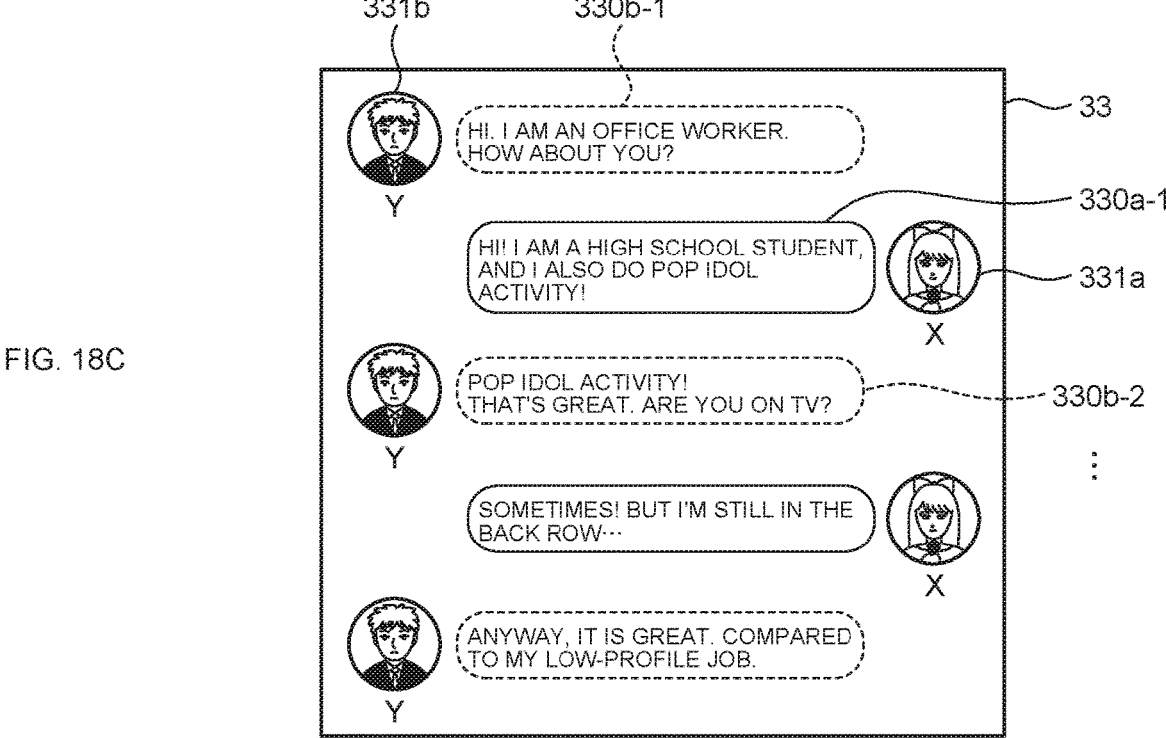

FIGS. 18A, 18B, and 18C are schematic diagrams illustrating an example of the persona information and the dialogue data evaluated to have a high quality dialogue by the persona combination evaluation unit 106 according to the embodiment.

FIG. 18A illustrates an example of persona information. In the illustrated example, the persona image 310a is an illustration image representing a woman holding a microphone in her hand and wearing a hair accessory, similarly to the example of FIG. 6 described above. Similarly to the profile information 311 of FIG. 6, the profile information 311b includes five items, namely Items #1 to #5, in which Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined to be a family structure (having an older brother) set for the person. Furthermore, Item #5 is defined as a pastime (enjoy cooking as a pastime) set for the person.

Furthermore, FIG. 18A illustrates an example of a situation set for the persona information illustrated in FIG. 18A. In the example of the drawing, the situation designated is talking about each other's occupations.

FIG. 18C illustrates an example of a dialogue performed between the worker X and the worker Y in accordance with the persona information illustrated in FIG. 18A and the situation illustrated in FIG. 18B. In this example, dialogue data 330b-1 from the worker Y is responded by the worker X with dialogue data 330a-1, and this response is then responded by the worker Y with dialogue data 330b-2, . . . and in this manner, utterances are alternately posted to establish a dialogue between the worker X and the worker Y.

In this example, it can be seen that the responses from the workers X and Y work very well in this dialogue, indicating that a high-quality dialogue has been performed.

In such a high-quality dialogue, both the subjective evaluation of the worker X and the quantitative evaluation by the system have high scores, leading to an estimation that the combination of the persona information is satisfactory. Accordingly, the persona combination evaluation unit 106 maintains the weight of the persona information illustrated in FIG. 18A. Alternatively, depending on the score of the subjective evaluation and the quantitative evaluation, the persona combination evaluation unit 106 increases the weight of the persona information to improve the likelihood of selecting the persona information.

FIGS. 19A, 19B, and 19C are schematic diagrams illustrating an example of the persona information and the dialogue data evaluated to have a low quality dialogue by the persona combination evaluation unit 106 according to the embodiment.

FIG. 19A illustrates an example of persona information. In the example of the drawing, a persona image 310c is an illustration image representing a woman who puts on a hat with her cheeks covered, and wears work clothes. Profile information 311c includes five items, namely Items #1 to #5, in which Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined to be a family structure (having two children) set for the person. Furthermore, Item #5 is defined as a pastime (enjoy workout as a pastime) set for the person.

Furthermore, FIG. 19B illustrates an example of a situation set for the persona information illustrated in FIG. 19A. In the example of the drawing, the situation designated is talking about each other's occupations.

FIG. 19C illustrates an example of a dialogue performed between the worker X and the worker Y in accordance with the persona information illustrated in FIG. 19A and the situation illustrated in FIG. 19B. The icon 331c indicates the worker X based on the persona image 310c. In this example, dialogue data 330b-10 from the worker Y is responded by the worker X with dialogue data 330a-10, and this response is then responded by the worker Y with dialogue data 330b-11, . . . and in this manner, utterances are alternately posted to establish a dialogue between the worker X and the worker Y.

In this example, it is pointed out, by the dialogue data 330b-11 from the worker Y, that the dialogue data 330a-10 indicating "being a high school student and performing pop idol activity" from the worker X in this dialogue has a big difference from the persona image 310c. Furthermore, it is also pointed out, by dialogue data 330b-12 from the worker Y, that dialogue data 330a-11 indicating "having two children" from the worker X has inconsistency with Items #1 to #3 of the profile information 311c, for example. In this manner, it can be seen that the responses from the workers X and Y do not work very well in example, indicating that a low-quality dialogue has been performed.

In such a low-quality dialogue, both the subjective evaluation of the worker X and the quantitative evaluation by the system have low scores, leading to an estimation that the combination of the persona information is not satisfactory. Accordingly, the persona combination evaluation unit 106 reduces the weight of the persona information illustrated in FIG. 19A so as to reduce the likelihood of selecting the persona information.

The dialogue data collection system 1 according to the embodiment can present the basis of the evaluation (weighting) for the combination of the persona information based on the subjective evaluation and the quantitative evaluation. For example, the persona combination evaluation unit 106 can present the basis of the evaluation by graphically expressing the relationship between the combination of the persona information and the quality of the dialogue.

FIGS. 20A, 20B, 20C, 20D, 20E, and 20F are schematic diagrams illustrating an example of a graph for presenting a basis for evaluation of a combination of persona information, presented by the persona combination evaluation unit 106 according to the embodiment. Here, as illustrated in FIGS. 20A, 20B, 20C, 20D, 20E, and 20F, the persona combination evaluation unit 106 generates scatter plots using the score of the subjective evaluation and the score of the quantitative evaluation for each of the persona information combinations A to F.

In the example of FIGS. 20A, 20B, 20C, 20D 20E, and 20F, the persona information combinations A, B, and D illustrated in FIGS. 20A, 20B, and 20D respectively are combinations in which the score by the subjective evaluation and the score by the quantitative evaluation are high (for example, both scores are 0.5 or more). In contrast, the persona information combination F in FIG. 20F is a combination in which the score by the subjective evaluation and the score by the quantitative evaluation are low (for example, both include a score of less than 0.5). The scatter plots in FIGS. 20A, 20B, 20C, 20D, 20E, and 20F are the basis for the quality of the persona information combinations A to F.

By weighting the combination of the persona information based on the results of the subjective evaluation and the quantitative evaluation, it is easy to select a high-quality combination. In this case, there is a possibility that only similar combinations are selected even after accumulation of individual evaluation results. In order to avoid this, it is preferable to generate a combination like "mutation" of the persona information like a genetic algorithm.

3-2-2. Flow of Combination Evaluation Processing of Persona Information

The combination evaluation processing of the persona information according to the embodiment will be described with reference to FIGS. 21A and 21B. FIG. 21A is a flowchart illustrating an example of persona information combination evaluation processing in an initial state according to the embodiment.

In Step S200, the dialogue data collection system 1 uses the persona information display unit 111 to selects one or more pieces of persona information to be presented to the workers X and Y from the persona information stored in the persona information DB 101 randomly or based on the setting. The persona information display unit 111 transmits the selected persona information to the worker terminals 20a and 20b. The worker terminals 20a and 20b each display the dialogue data collection screen 30 including the persona information transmitted from the persona information display unit 111.

The worker X and the worker Y perform dialogue in accordance with the persona information respectively displayed on the worker terminals 20a and 20b, and transmit the dialogue data 330a and 330b to the server 10, respectively.

In the next Step S201, the dialogue data collection system 1 uses the dialogue collection unit 112 to acquire the dialogue data 330a and 330b of the workers X and Y and store the acquired dialogue data in the dialogue data DB 102. In addition, the dialogue data collection system 1 acquires information indicating the subjective evaluation of the worker X by the subjective evaluation collection unit 113.

In addition, the dialogue data collection system 1 uses the dialogue automatic evaluation unit 105 to acquire information indicating quantitative evaluation of the dialogue based on the acquired dialogue data 330a and 330b.

In the next Step S202, the persona combination evaluation unit 106 calculates a score based on the information indicating the subjective evaluation acquired by the subjective evaluation collection unit 113. In addition, the persona combination evaluation unit 106 calculates a score based on the information indicating the quantitative evaluation acquired by the dialogue automatic evaluation unit 105. Based on the calculated scores, the persona combination evaluation unit 106 evaluates the combination of the persona information selected in Step S200.

In the next Step S203, based on the evaluation result in Step S202, the persona combination evaluation unit 106 updates the weight of the persona information combination selected in Step S200.

FIG. 21B is a flowchart illustrating an example of persona information combination evaluation processing in a case where a sufficient system operation is performed according to the embodiment.

In Step S210, the dialogue data collection system 1 uses the persona information display unit 111 to select one or more pieces of persona information to be presented to the workers X and Y from the persona information stored in the persona information DB 101 in consideration of the weighting condition of the persona information combination. The weighting condition for the persona information combination is designated for the dialogue data collection system 1 by the operator of the dialogue data collection system 1, for example.

The persona information display unit 111 transmits the selected persona information to the worker terminals 20a and 20b. The worker terminals 20a and 20b each display the dialogue data collection screen 30 including the persona information transmitted from the persona information display unit 111.

The processing after Step S210 is common to the processing of Steps S201 to S203 in the flowchart of FIG. 21A, and thus the description thereof is omitted here.

3-2-3. Change in Persona Information Due to Updated Weight

As described above, the weight of the persona information combination is updated in Step S203 in the flowcharts of FIGS. 21A and 21B. In the dialogue data collection system 1, after the progress of the collection of the dialogue data 330a and 330b and repeated execution of the weight update for the persona information combinations, there will remain high-quality persona information combinations considering the easiness of work by the workers X and Y.

Figure 22:
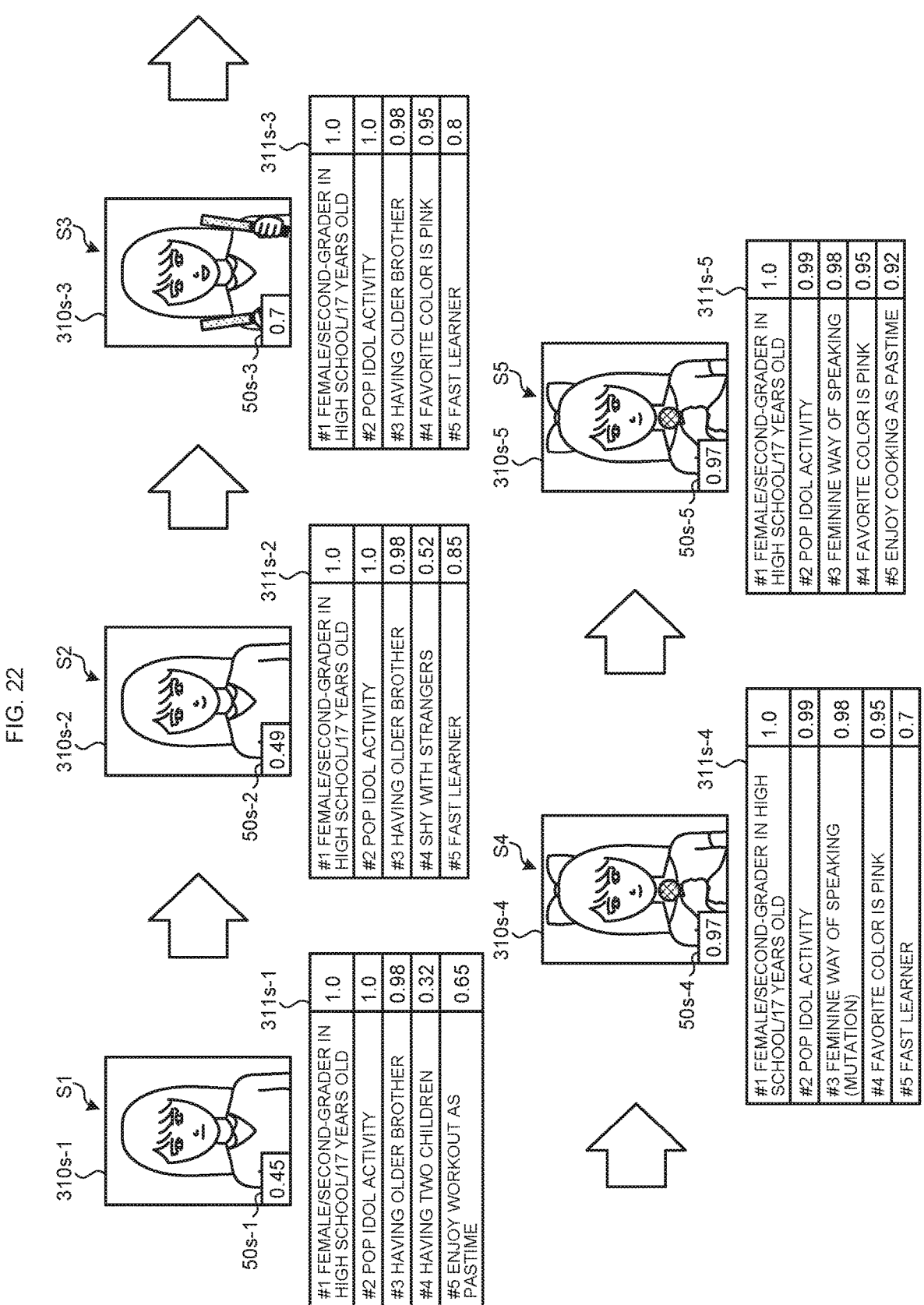
FIG. 22 is a schematic diagram illustrating an example of a change in the persona information along with an update of the weight of the combination of the persona information according to the embodiment.

FIG. 22 is a schematic diagram illustrating an example of a change in the persona information along with an update of the weight of persona information combinations according to the embodiment. More specifically, FIG. 22 illustrates Steps S1 to S5 as well as states in which the weight of the persona information changes together with the progress of the collection of the dialogue data and the persona information is updated accordingly.

Note that, in FIG. 22, a change in the persona information is illustrated assuming that the weight is calculated for the persona image 310 and each item of the profile information 311 in each of the subjective evaluation and the quantitative evaluation. In addition, the weight takes a value of [0] or more and [1.0] or less, and the dialogue data collection system 1 is supposed to acquire the persona information from the persona information DB 101 in accordance with the probability based on the weight.

In the following description, it is assumed that, in the persona information, Item #1 "female/second-grader in high school/17 years old" and Item #2 "pop idol activity" are fixed in Steps S1 to S5 as the profile information.

Step S1 illustrates an example of the persona information in the initial state. In Step S1, the dialogue data collection system 1 extracts a persona image 310s-1 and profile information 311s-1 from the persona information DB 101 randomly or based on a predetermined setting, and presents the extracted data as the persona information.

In this example, the persona image 310s-1 is presented as an illustration image of a woman with no facial expression, no decoration, and a weight 50s-1 is set to [0.45]. The profile information 311s-1 includes five items, namely, Items #1 to #5. Item #1 is defined as the gender (female), the status (second-grader in high school), and the age (17 years old) set to the person. Item #2 is defined as an occupation (pop idol activity) set to the person. Item #3 is defined to be a first family structure (having an older brother) of the person. Item #4 is defined to be a second family structure (having two children) set for the person. Furthermore, Item #5 is defined as a pastime (enjoy workout as a pastime) set for the person. Furthermore, as illustrated at the right end, Items #1 to #5 have weights of [1.0], [1.0], [0.98], [0.32], and [0.65], respectively.

In Step S2, the persona image 310s-1 in Step S1 is updated to a persona image 310s-2, which is an illustration image of a woman having no decoration but having an expression. The persona image 310s-2 has a weight 50s-2 set to [0.49] which is larger than the weight of the persona image 310s-1. Furthermore, in the profile information 311s-2, Items #4 and #5 with low weights in Step S1 are updated to be Item #4 "shy with strangers" (weight [0.52] and Item #5 "fast learner" (weight [0.85]), respectively.

In Step S3, the expression of the persona image 310s-2 in Step S2 is further emphasized and updated to be a persona image 310s-3, which is an illustration image of a woman holding an item in both hands. The persona image 310s-3 has a weight 50s-3 set to [0.7] which is larger than the weight of the persona image 310s-2. In the profile information 311s-3, Item #4 with a low weight in Step S2 is updated to be Item #4 "Pink is my favorite color" (weight [0.95]. Moreover, in the profile information 311s-3, the weight of Item #5 "fast learner" is set to [0.8], which is lower than the weight in Step S2.

In Step S4, the persona image 310s-3 in Step S3 is updated to a persona image 310s-4, which is an illustration image of a woman wearing a hair accessory and holding a microphone in her hand. The persona image 310s-4 has a weight 50s-4 set to [0.97] which is higher than the weight of the persona image 310s-3. Furthermore, in the profile information 311s-4, the weight of Item #2 "pop idol activity" is set to [0.99], which is lower than the weight in Step S3. In Item #3, the mutation is applied to "having an older brother" indicating the family structure in the profile information 311s-3 and has been updated to "feminine way of speaking" (weight [0.98]) indicating an utterance style. Moreover, in the profile information 311s-4, the weight of Item #5 "fast learner" is set to [0.7], which is lower than the weight in Step S3.

In Step S5, the persona image 310s-4 in Step S4 is used as it is as a persona image 310s-5, and a weight 50s-5 is set to [0.97] which is the same as the weight of the persona image 310s-4. Furthermore, in the profile information 311s-5, Item #5 "fast learner" having the lowest weight in Step S4 has been updated to Item #5 "enjoy cooking as a pastime" (weight [0.92]) having a higher weight. The items #1 to #4 in the profile information 311s-5 have no change from Step S4.

In this manner, in the embodiment, the persona information is updated to information with a higher weight together with the progress of collection of the dialogue data. This makes it possible to improve the easiness of dialogue by the worker.

4. First Modification of Embodiment of Present Disclosure

Next, a first modification of the embodiment of the present disclosure will be described. In the above-described embodiment, the inconsistency of the dialogue with the persona information is detected, and the warning or the like is presented. In contrast, in the first modification of the embodiment, inconsistency is detected for information outside the range of persona information included in the dialogue. More specifically, in the first modification of the embodiment, the dialogue data collection system 1 refers to past dialogue data with respect to the utterance input by the worker, and detects inconsistency between the information included in the utterance and the information included in the past dialogue data.

As an example, the following will discuss a case in which a dialogue is performed between a worker X to which specific persona information to be a target of dialogue log collection is presented and a worker Y to which other unspecific persona information is presented. Note that the specific persona information is assumed to be persona information at a point in time when the collection of the dialogue log has sufficiently progressed. Furthermore, it is assumed that the specific persona information is presented to a worker X' different from the worker X before the dialogue between the worker X and the worker Y and that dialogue logs have been collected by a dialogue performed between the worker X' and another worker.

Here, it is assumed that a dialogue log generated by the dialogue between the worker X and the worker Y is collected in addition to the dialogue log generated by the dialogue between the worker X' to which the specific persona information has been presented and the another worker. In this case, there can be a case where inconsistency occurs between information other than the persona information, included in the dialogue data by the worker X' and information included in the utterance input by the worker X after the dialogue by the worker X'.

FIGS. 23A and 23B are schematic diagrams for more specifically describing processing according to the first modification of the embodiment. FIG. 23A illustrates an example of dialogue log information collected in relation to the specific persona information and registered in the dialogue data DB 102. In this example, the dialogue log information has a configuration in which dialogue data pieces by a worker (referred to as a worker X') to which the specific persona information has been presented are registered with numbers in chronological order. Specifically, in the example of FIG. 23A, the dialogue data of number [1] includes a description of "a girl as second-grader in high school", and the dialogue data of number [2] includes a description of "pop idol activity". The dialogue data of number [3] includes a description of "good at national language (Japanese)", and the dialogue data of number [4] includes a description of "won second place in exams".

FIG. 23B illustrates an example of the specific persona information, an utterance input by a worker (referred to as a worker X) to which the specific persona information is presented, and a warning display for the utterance. In FIG. 23B, section (a) illustrates an example of the specific persona information. The persona information illustrated in the section (a) is the same as the persona information described with reference to FIG. 6, and thus description thereof is omitted here.

In FIG. 23B, section (b) illustrates an example of an utterance input to the input region 34 by the worker X in accordance with the persona information illustrated in section (a). In this example, the input utterance is "I am not good at national language (Japanese)", and the portion of "not good at national language (Japanese)" is an inconsistent portion 363 which is inconsistent with the description of "I am good at national language (Japanese)" of number [3] in the dialogue log information illustrated in FIG. 23A.

Note that the classification class and the inconsistency determination criterion described with reference to (1) to (6) in FIG. 16 in the embodiment can be applied as the classification class and the inconsistency determination criterion in this case.

With reference to the dialogue data DB 102 by the inconsistency detection unit 103, the dialogue data collection system 1 detects inconsistency of the utterance with the dialogue data included in the dialogue log. When inconsistency is detected, the inconsistency display unit 110 presents, in the display region 36, a message that the description of the inconsistent portion 363 is inconsistent with the description of "good at national language (Japanese)" in the dialogue data "I am doing my best in studying too! I am good at national language (Japanese)" of number [3] included in the dialogue log information. At this time, it is preferable that the inconsistency display unit 110 highlight the portion 364 of "good at national language (Japanese)".

As a first example of the inconsistency detection according to the first modification of the embodiment, the dialogue data collection system 1 can issue a warning about the existence of the inconsistency only by detecting one inconsistency in a similar category in the dialogue log information collected in the past. For example, with reference to section (a) in FIG. 23B, it is assumed that the utterance includes a description related to a category regarding "subject the person is good at" which is not included in profile information 311 of the presented persona information. In this case, in a case where the description regarding the category "subject the person is good at" included in the utterance is inconsistent with the information regarding the category "subject the person is good at" registered prior to the utterance, the inconsistency display unit 110 can give a warning about the inconsistency.

As a second example of inconsistency detection according to the first modification of the embodiment, when there is an accumulation of a plurality of inconsistent descriptions outside the range of persona information, the dialogue data collection system 1 can reflect a trend of majority. For example, utterances including similar types of descriptions are classified into classes by the X-means method or the like, and when the number of utterances in a cluster exceeds a threshold, it is determined to be the trend of majority. In the above example, in a case where a plurality of descriptions of "good at national language (Japanese)" and a plurality of descriptions of "poor at national language (Japanese)" have been collected in the dialogue log information, the description with larger numbers among "good at national language (Japanese)" and "poor at national language (Japanese)" is determined as true. In a case where the input utterance includes a description inconsistent with the description determined as true, the inconsistency display unit 110 gives a warning about the description included in the input utterance as inconsistency.

In principle, it is preferable to adopt the second example among the first example and the second example described above.

Figure 24:
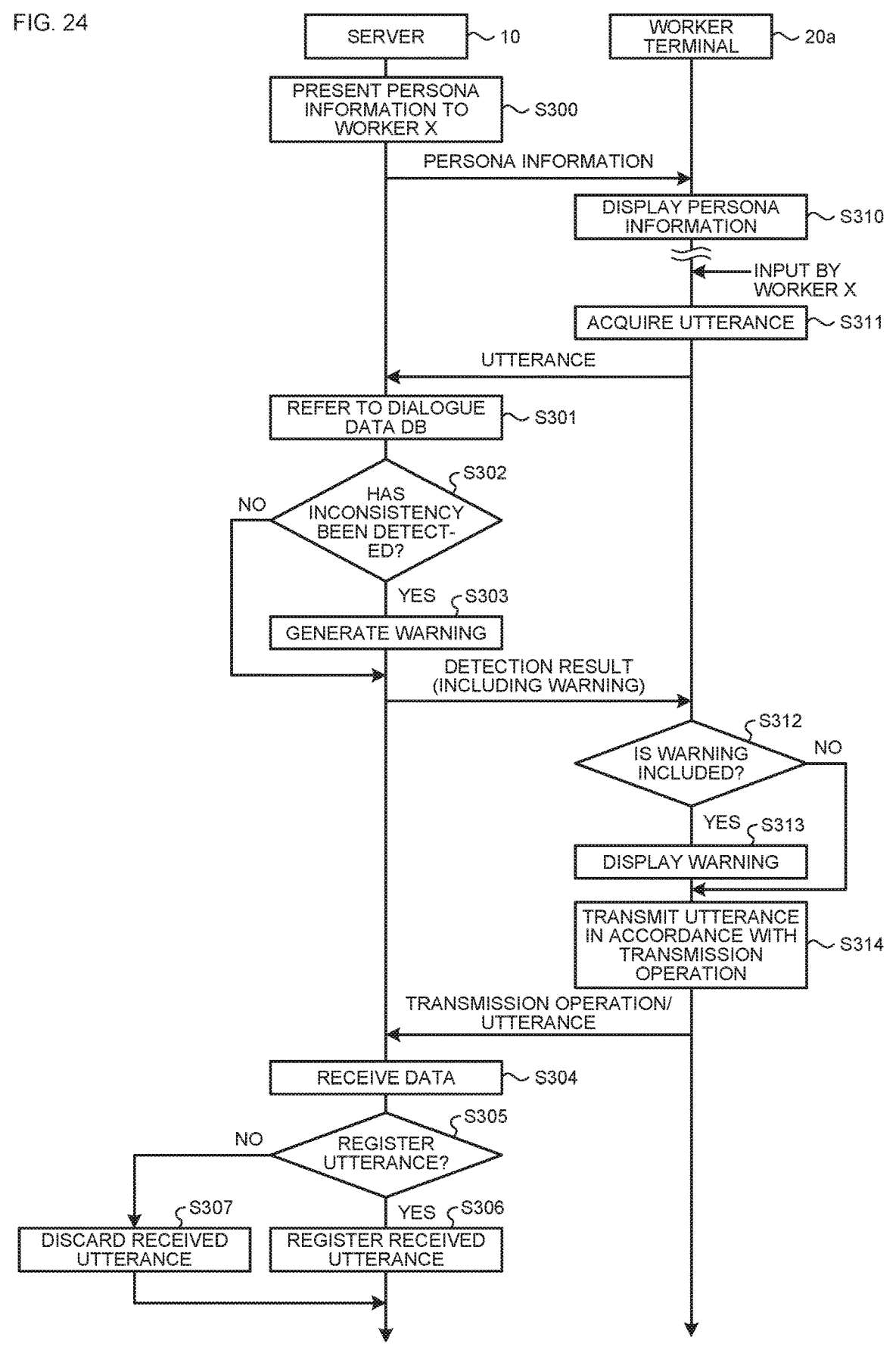

FIG. 24 is a flowchart of an example illustrating inconsistency detection processing according to the first modification of the embodiment. The flowchart of FIG. 24 runs focusing on processing performed by the server 10 and processing performed by the worker terminal 20a used by the worker X. Furthermore, the following is a case of applying the second example out of the first and second examples of inconsistency detection according to the first modification of the above-described embodiment.

In Step S300, the server 10 uses the persona information display unit 111 to acquire persona information randomly or in a predetermined combination from the persona information DB 101, transmits the acquired persona information to the worker terminal 20a, and presents the persona information to the worker X. In Step S310, the worker terminal 20a uses the display unit 203 to display the persona information transmitted from the server 10.

In practice, the server 10 transmits, to the worker terminal 20a, display control information for displaying the dialogue data collection screen 30 including the acquired persona information and the information indicating the situation, for example. The worker terminal 20a uses the display unit 203 to display the dialogue data collection screen 30 on a display or the like in accordance with the display control information transmitted from the server 10. The processing related to the display in the worker terminal 20a is performed by updating the dialogue data collection screen 30 in the server 10 except for the input processing regarding the input region 34, but here, the description will be given assuming that the processing is to be executed in the worker terminal 20a.

The worker X inputs the utterance into the input region 34 of the dialogue data collection screen 30 displayed on the worker terminal 20a, and the input unit 202 acquires the utterance (Step S311). The worker terminal 20a transmits the acquired utterance to the server 10. The utterance is received by the server 10 and acquired by the dialogue collection unit 112.

In Step S301, the server 10 uses the inconsistency detection unit 103 to refer to the dialogue log information stored in the dialogue data DB 102 based on the utterance acquired by the dialogue collection unit 112. The inconsistency detection unit 103 detects the utterance's inconsistency outside the range of the persona information with the dialogue data included in the dialogue log information. In the next Step S302, the server 10 determines whether inconsistency has been detected in Step S301 by the inconsistency display unit 110. When determined that inconsistency has been detected (Step S302, "Yes"), the processing proceeds to Step S303.

In contrast, when determined that no inconsistency has been detected in Step S302 (Step S302, "No"), the server 10 skips the processing of Step S303.

In Step S303, the server 10 uses the inconsistency display unit 110 to generate a warning according to the detected inconsistency.

After the processing of Step S303, or in a case where no inconsistency has been detected in Step S302 and Step S303 has been skipped, the server 10 transmits information including a detection result of the inconsistency, as well as warning created, if any, to the worker terminal 20a.

In Step S312, the worker terminal 20a determines whether the information transmitted from the server 10 includes a warning. When determined that the information includes a warning (Step S312, "Yes"), the processing proceeds to Step S313. In contrast, when the worker terminal 20a determines in Step S312 that the suggested correction, etc. is not included (Step S312, "No"), the processing of Step S313 is skipped, and the processing proceeds to Step S314.

In Step S313, the worker terminal 20a uses the display unit 203 to display the warning transmitted from the server 10 in the display region 36 of the dialogue data collection screen 30, and proceeds to processing of Step S314.

In Step S314, in response to the operation on the send button 35, the worker terminal 20a transmits the utterance input in the input region 34 to the server 10. Note that the worker X can correct the utterance input to the input region 34 in accordance with the warning displayed in Step S313. In a case where the utterance has been corrected, the corrected utterance is transmitted to the server 10. In addition, the worker terminal 20a transmits, together with the utterance, transmission operation information indicating that the send button 35 has been operated, to the server 10.

In Step S304, the server 10 receives the utterance and the transmission operation information transmitted from the worker terminal 20a. In the next Step S305, the server 10 determined whether to register the received utterance in the dialogue data DB 102 as the dialogue data 330a regarding the worker X by the dialogue collection unit 112. The dialogue collection unit 112 refers to the dialogue data DB 102, for example, and determines to register the utterance in a case where the description of inconsistency included in the utterance received from the worker terminal 20a is a matter of majority.

When having determined to register the utterance in Step S305 (Step S305, "Yes"), the dialogue collection unit 112 proceeds to processing of Step S306, and registers the utterance received in Step S304 in the dialogue data DB 102 as the dialogue data 330a obtained by the worker X. In contrast, when having determined not to register the utterance in Step S305 (Step S305, "No"), the dialogue collection unit 112 proceeds to the processing of Step S307 and discards the utterance received in Step S304. Operation is not limited thereto, and even when it is determined in Step S305 not to register the utterance, the dialogue data 330a related to the utterance may be registered in the dialogue data DB 102.

In the first modification of the embodiment, it is also possible to present a new candidate for persona information by applying the inconsistency determination result. In the above-described example, it is conceivable to present a candidate for the profile information 311 included in the persona information based on the utterance determined to be registered in Step S305 (for example, "good at national language (Japanese)" or "poor at national language (Japanese)"). This makes it possible to present an utterance that produces a low-frequency but high-quality dialogue.

Whether the persona information including the presented candidate facilitates impersonation for the worker X and facilitates the dialogue also for the worker Y being a dialogue partner can be determined by performing the subjective evaluation as described in the embodiment.

Furthermore, in the first modification of the embodiment, there can be a case where, even when there is a trend of majority regarding the description outside the range of persona information, the trend of "the easiness of the dialogue by the worker Y being the dialogue partner" is low (for example, evaluation value regarding the evaluation is a predetermined value or less) based on the result of the subjective evaluation or the like. In this case, the dialogue data corresponding to the description can be excluded from the data to be registered. This prevents notification or registration of an inappropriate utterance or setting caused by a malicious worker's attack.

In this manner, according to the first modification of the embodiment, even in a case where an utterance having a description outside the range of the presented persona information is input to the dialogue data by various workers in which the same persona information is presented, it is possible to maintain the consistency of the persona information. This make it possible to collect the dialogue data which is easy to handle after collection of dialogue log information.

5. Second Modification of Embodiment of Present Disclosure

Next, a second modification of the embodiment of the present disclosure will be described. The second modification of the embodiment is an example in which an image included in the persona information is generated based on the persona information. More specifically, in the second modification of the embodiment, an image included in the persona information is generated based on at least the combination of the profile information 311 included in the persona information, determined to have good quality.

Figures 25A, 25B:
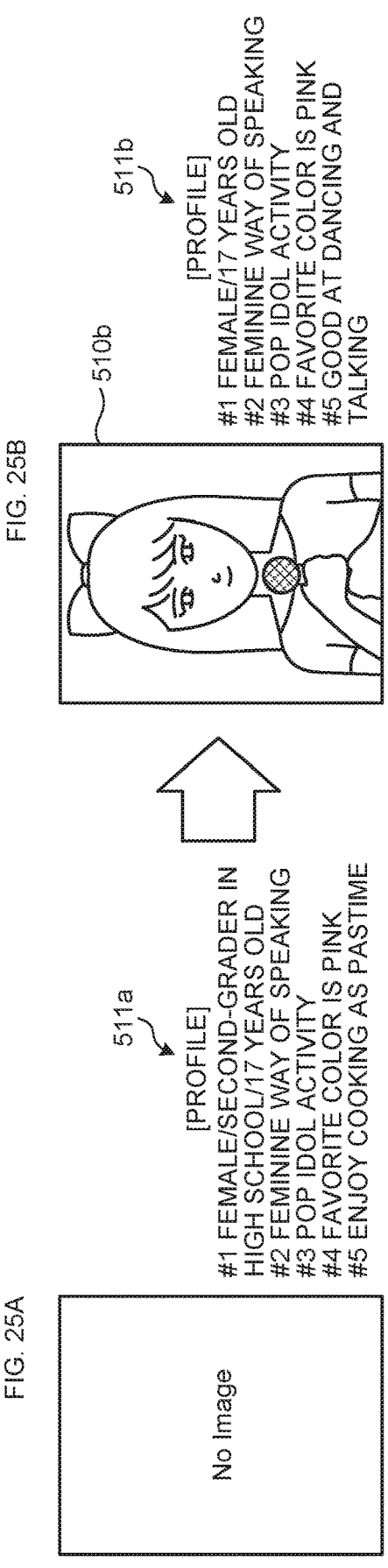
FIGS. 25A and 25B are schematic diagrams illustrating a first example of image generation processing according to a second modification of the embodiment.

FIGS. 25A and 25B are schematic diagrams illustrating a first example of image generation processing according to the second modification of the embodiment. In the first example, as illustrated in FIG. 25A, only profile information 511a exists in persona information and no profile image exists in the persona information. The profile information 511*a* is assumed to have the combination of Items #1 to #5 determined to be a sufficiently good combination by the subjective evaluation described in the embodiment, for example.

In the dialogue data collection system 1, the persona image generation unit 104 generates a persona image 510*b* illustrated in the FIG. 25B based on Items #1 to #5 of the profile information 511*a*.

For example, as illustrated in FIG. 25A, in the profile information 511*a*, Item #1 is defined as the gender (female), the status (second-grader in high school), and the age (17 years old) set to the person. Item #2 is defined as an utterance style (feminine way of speaking) set for the person. Item #3 is defined as an occupation (pop idol activity) of the person. Item #4 is defined as a preference (favorite color is pink) set to the person. Furthermore, Item #5 is defined as a pastime (enjoy cooking as a pastime) set for the person.

For example, the persona image generation unit 104 generates the persona image 510*b* based on information such as "female", "second-grader in high school", "17 years old", "feminine way of speaking", "pop idol activity", "pink", and "enjoy cooking as a pastime" included in Items #1 to #5. At this time, the persona image generation unit 104 can use Generative Adversarial Networks (GAN) to generate the persona image 510*b*, for example. The generation is not limited to this, and the persona image generation unit 104 may select an image corresponding to each of the above-described pieces of information included in each of Items #1 to #5 of the profile information 511*a* from among a plurality of persona images pre-stored in the persona information DB 101, and may set the selected image as the persona image 510*b*.

In the example of FIGS. 25A and 25B, together with generation of the persona image 510*b*, the profile information 511*a* is updated to generate the profile information 511*b* corresponding to the persona image 510*b*. The persona information is constituted to include the persona image 510*b* and the profile information 511*b*. The persona image generation unit 104 stores the generated persona image 510*b* and profile information 511*b* in the persona information DB 101.

Figures 26A, 26B:
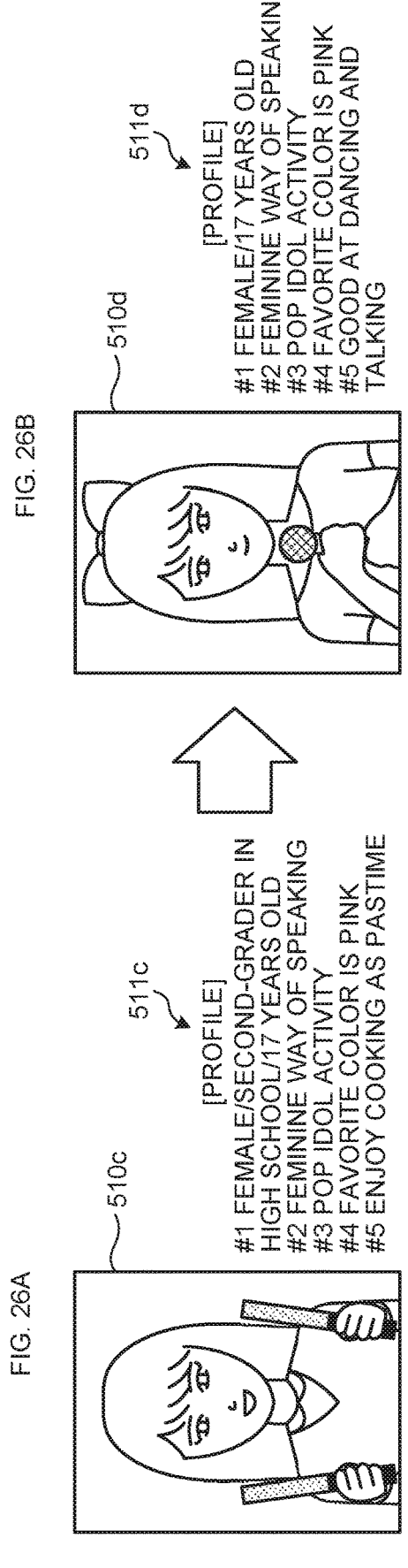
FIGS. 26A and 26B are schematic diagrams illustrating a second example of image generation processing according to the second modification of the embodiment.

FIGS. 26A and 26B are schematic diagrams illustrating a second example of image generation processing according to the second modification of the embodiment. In the first example, as illustrated in FIG. 26A, the persona information is constituted to include a persona image 510*c* and profile information 511*c*. In this case, as illustrated in FIG. 26B, the persona image generation unit 104 can generate a new persona image 510*d* based on the persona image 510*c* and Items #1 to #5 of the profile information 511*c*.

Also in the example of FIGS. 26A and 26B, similarly to the example of FIGS. 25A and 25B described above, together with the generation of the persona image 510*d*, the profile information 511*c* is updated to generate profile information 511*d* corresponding to the persona image 510*d*. The persona information is constituted to include the persona image 510*d* and the profile information 511*d*.

FIGS. 27A and 27B are schematic diagrams illustrating a third example of image generation processing according to the second modification of the embodiment. This third example is an example of generating a persona image in a set of persona information based on a plurality of patterns of persona information. As illustrated in FIG. 27A, the set of persona information includes: first persona information based on the persona image 510*e*-1 and the profile information 511*e*-1; and second persona information based on the profile information 511*e*-2. The first persona information indicates the persona of "at work", and the second persona information indicates the persona of "at school". In the example of the drawing, the second persona information includes no persona image.

In this case, based on the profile information 511*e*-2 to be a target for generating a persona image and another image, for example, the persona image 510*e*-1 included in the first persona information, the persona image generation unit 104 can generate a persona image 510*f*-2 illustrated in the FIG. 26B.

This point will be described more specifically. In FIG. 27A, persona image 510*e*-1 represents a woman holding a microphone in her hand and wearing a hair accessory. Furthermore, in the profile information 511*e*-1, Item #1 indicates the gender (female) and the age (17 years old) set for the person. Item #2 is defined as an utterance style (feminine way of speaking) set for the person. Item #3 is defined as an occupation (pop idol activity) of the person. Item #4 is defined as a preference (favorite color is pink) set to the person. Furthermore, Item #5 is defined as a pastime (good at dancing and talking) set for the person.

On the other hand, in the profile information 511*e*-2, Item #1 indicates the gender (female) and the age (17 years old) set for the person. Item #2 is defined as an utterance style (feminine way of speaking) set for the person. Item #3 is an occupation of the person (second-grader in high school). Item #4 is defined to be a family structure (having an older brother) set for the person. Furthermore, Item #5 is defined as a pastime (enjoy cooking as a pastime) set for the person.

For example, it is conceivable that the persona image generation unit 104 modifies the persona image 510*e*-1 based on the profile information 511*e*-2 to be a target for generating the persona image. As an example, based on the information of Items #3 to #5 different from the profile information 511*e*-1 among Items #1 to #5 of the profile information 511*e*-2, the persona image generation unit 104 deletes the microphone and the hair accessory from the persona image 510*e*-1, puts on a high school uniform to generate the persona image 510*f*-2.

Alternatively, the persona image generation unit 104 may select a persona image corresponding to the profile information 511*e*-1 from the persona images stored in the persona information DB 101, and use the selected persona image as the persona image 510*f*-2.

In the example of FIGS. 27A and 27B, the persona image generation unit 104 uses the persona image 510*e*-1 and the profile information 511*e*-1 as they are as the persona image 510*f*-1 and the profile information 511*f*-1, respectively. The persona image generation unit 104 also uses the profile information 511*e*-2 as it is as the profile information 511*f*-2.

The persona image generation unit 104 stores the generated persona image 510*f*-2 in association with the profile information 511*f*-2 in the persona information DB 101.

In this manner, according to the second modification of the embodiment, the dialogue data collection system 1 generates the persona image based on the combination of the profile information determined to have high quality. Therefore, by applying the second modification of the embodiment, it is possible to supplement the imaginary power of the worker who performs the dialogue with the persona image generated based on the profile information included in the persona information.

The effects described in the present specification are merely examples, and thus, there may be other effects, not limited to the exemplified effects.

Note that the present technique can also have the following configurations.

(1) An information processing device comprising:

a role presentation unit that presents, to a first user, a role set to the first user;

an acquisition unit that acquires first data input by the first user at a time of input of the first data;

a detection unit that detects, as inconsistency information, information that is included in the first data acquired by the acquisition unit and inconsistent with the role; and an inconsistency presentation unit that presents, to the first user, a message based on the inconsistency information detected from the first data by the detection unit.

(2) The information processing device according to the above (1), wherein the inconsistency presentation unit generates a suggested correction for the first data based on the inconsistency information and the role, and presents the generated suggested correction to the first user.

(3) The information processing device according to the above (1) or (2), wherein the detection unit detects the inconsistency based on at least either one of description indicated by the first data or a style in the first data.

(4) The information processing device according to any one of the above (1) to (3), wherein the role presentation unit presents the role to the first user by using persona information including at least either one of image information of a character or attribute information of the character.

(5) The information processing device according to the above (4), wherein the role presentation unit presents, to the first user, a plurality of the roles corresponding to a plurality of pieces of the persona information on a one-to-one basis.

(6) The information processing device according to the above (4) or (5), further comprising an evaluation unit that evaluates a combination of information included in the persona information based on the first data and second data, the second data being data input by a second user as a dialogue partner of the first user, wherein the evaluation unit changes the combination of the information in the persona information in accordance with the evaluation.

(7) The information processing device according to the above (6), wherein the evaluation unit evaluates a combination of the image information and the attribute information included in the persona information.

(8) The information processing device according to the above (6), wherein the evaluation unit evaluates a combination of information included in the attribute information.

(9) The information processing device according to any one of the above (6) to (8), wherein the evaluation unit performs the evaluation based on at least one of: subjective evaluation by subjective opinion of at least either one of the first user or the second user according to the first data and the second data; and quantitative evaluation using an index calculated based on the first data and the second data.

(10) The information processing device according to any one of the above (4) to (9), wherein the detection unit detects the inconsistency based on at least either one of the image information or the attribute information.

(11) The information processing device according to any one of the above (4) to (10), further comprising an image generation unit that generates new image information based on a combination of the image information and the attribute information, or based on a combination of information included in the attribute information, wherein the role presentation unit presents the role to the first user by using the persona information including a combination of the attribute information and the new image information.

(12) The information processing device according to any one of the above (1) to (11), further comprising a registration unit that registers the first data as log information in a log information storage unit, wherein, when the first data in which the inconsistency information has been detected by the detection unit is corrected, the registration unit registers the corrected first data in the log information storage unit as the log information.

(13) The information processing device according to the above (12), wherein the log information includes data input by a user different from the first user, to whom the role having been presented in common with the first user.

(14) The information processing device according to the above (12) or (13), wherein the detection unit further detects information that is included in the first data acquired by the acquisition unit and is inconsistent with the log information, as the inconsistency information.

(15) The information processing device according to the above (14), wherein the role presentation unit performs operations including:

presenting the role to the first user by using persona information including at least either one of image information of a character and attribute information of the character; and generating new persona information based on information inconsistent with the log information detected by the detection unit, and presenting the role based on the generated persona information to the first user.

(16) The information processing device according to any one of the above (12) to (15), wherein, when a predetermined number or more of pieces of information of categories common to each other and inconsistent with the log information have been detected, the detection unit detects information inconsistent with the information inconsistent with the log information, included in the first data, as the inconsistency information.

(17) The information processing device according to any one of the above (12) to (16), wherein the registration unit operates such that, when a predetermined number or more of pieces of information inconsistent with the log information in a category common to each other have been detected by the detection unit, and when evaluation of the dialogue of the first user with the second user being the dialogue partner regarding the information inconsistent with the log information is a predetermined level or less, the registration unit does not register the information inconsistent with the log information in the log information storage unit.

(18) The information processing device according to any one of the above (1) to (17), wherein the role presentation unit further performs operation of presenting, to a second user being a dialogue partner of the first user, a role to be set to the second user.

(19) An information processing method comprising steps executed by a processor, the steps including:

a role presentation step of presenting, to a first user, a role set to the first user;

an acquisition step of acquiring first data input by the first user at a time of input of the first data;

a detection step of detecting, as inconsistency information, information that is included in the first data acquired by the acquisition step and inconsistent with the role; and an inconsistency presentation step of presenting, to the first user, a message based on the inconsistency information detected from the first data by the detection step.

REFERENCE SIGNS LIST

1 DIALOGUE DATA COLLECTION SYSTEM
10 SERVER
20, 20*a*, 20*b* WORKER TERMINAL
30 DIALOGUE DATA COLLECTION SCREEN
31, 31*a*, 32, 33, 36, 401 DISPLAY REGION
34, 410*a*, 410*b* INPUT REGION
35, 42 SEND BUTTON
40 SUBJECTIVE EVALUATION INPUT SCREEN
41 EVALUATION INPUT REGION
100 DIALOGUE DATA COLLECTION SCREEN GENERATION UNIT
101 PERSONA INFORMATION DB
102 DIALOGUE DATA DB
103 INCONSISTENCY DETECTION UNIT
104 PERSONA IMAGE GENERATION UNIT
105 DIALOGUE AUTOMATIC EVALUATION UNIT
106 PERSONA COMBINATION EVALUATION UNIT
110 INCONSISTENCY DISPLAY UNIT
111 PERSONA INFORMATION DISPLAY UNIT
112 DIALOGUE COLLECTION UNIT
113 SUBJECTIVE EVALUATION COLLECTION UNIT
202 INPUT UNIT
203 DISPLAY UNIT
310, 310*a*, 310*b*, 310*c*, 310*s*-1, 310*s*-2, 310*s*-3, 310*s*-4, 310*s*-5, 510*b*, 510*c*, 510*d*, 510*e*-1, 510*f*-1, 510*f*-2 PERSONA IMAGE
311, 311*a*, 311*b*, 311*c*, 311*s*-1, 311*s*-2, 311*s*-3, 311*s*-4, 311*s*-5, 511*a*, 511*b*, 511*c*, 511*d*, 511*e*-1, 511*e*-2, 511*f*-1, 511*f*-2 PROFILE INFORMATION
330*a*, 330*a*-1, 330*a*-10, 330*a*-11, 330*b*, 330*b*-1, 330*b*-2, 330*b*-10, 330*b*-11, 330*b*-12 DIALOGUE DATA
400 DIALOGUE DISPLAY REGION

The invention claimed is:

1. An information processing device, comprising:
a central processing unit (CPU) configured to:
acquire persona information from a database via a network, wherein
the persona information is stored in the database, and
the persona information includes at least one of image information of a character or attribute information of the character;
control a first terminal device to display a role of a first user, wherein
the role of the first user includes the persona information, and the first terminal device is associated with the first user;
acquire first data from the first terminal device based on first user input associated with the first user, wherein the first data includes dialogue data between the first user and a second user;
detect inconsistency information based on the acquired first data, wherein the inconsistency information includes information of the dialogue data that is inconsistent with content of the persona information;
control the first terminal device to display a message based on the detected inconsistency information;
evaluate the persona information based on the displayed message;
update the stored persona information based on the evaluation;
execute a machine learning algorithm to generate new image information, wherein the new image information is generated based on the updated stored persona information; and
control the first terminal device to display the new image information.

2. The information processing device according to claim 1, wherein the CPU is further configured to:
generate a suggested correction for the first data, based on the inconsistency information; and
control the first terminal device to present the generated suggested correction.

3. The information processing device according to claim 1, wherein the CPU is further configured to detect the inconsistency information based on at least one of description of the first data or a style in the first data.

4. The information processing device according to claim 1, wherein
the CPU is further configured to control the first terminal device to present a plurality of roles corresponding to a plurality of pieces of the persona information,
each role of the plurality of roles corresponds to a respective piece of the plurality of pieces of the persona information, and
the plurality of roles includes the role of the first user.

5. The information processing device according to claim 1, wherein the CPU is further configured to:
acquire second data from a second terminal device based on a second user input associated with the second user, wherein
the second terminal device is associated with the second user, and
the second user is a dialogue partner of the first user;
evaluate a combination of specific information included in the persona information, wherein the combination of the specific information is evaluated based on the first data and the second data; and
change the combination of the specific information based on the evaluation of the combination of the specific information.

6. The information processing device according to claim 5, wherein the combination of the specific information of the persona information includes a combination of the image information and the attribute information.

7. The information processing device according to claim 5, wherein the attribute information includes the combination of the specific information.

8. The information processing device according to claim 5, wherein the evaluation of the persona information includes-based on at least one of a subjective evaluation and a quantitative evaluation, and the CPU is further configured to:

obtain subjective opinion of at least one of the first user or the second user based on the first data and the second data;

execute the subjective evaluation based on the subjective opinion;

calculate an index based on the first data and the second data; and execute the quantitative evaluation based on the index.

9. The information processing device according to claim 1, wherein the CPU is further configured to detect the inconsistency information based on at least one of the image information or the attribute information.

10. The information processing device according to claim 1, wherein the CPU is further configured to:

generate the new image information based on one of:

a combination of the image information and the attribute information, or a combination of information of the attribute information; and control the first terminal device to display the role of the first user based on new persona information, wherein the new persona information includes a combination of the attribute information and the new image information.

11. The information processing device according to claim 1, wherein the CPU is further configured to:

register the first data as log information in a log information storage unit;

correct the first data based on the inconsistency information; and register the corrected first data in the log information storage unit as the log information.

12. The information processing device according to claim 11, wherein the CPU is further configured to:

acquire second data from a second terminal device based on a second user input associated with the second user; and control the second terminal device to display the role of the first user, wherein the role of the first user is displayed on the second terminal device in common with the first terminal device, and the log information includes the second data.

13. The information processing device according to claim 11, wherein the inconsistency information includes specific information of the first data that is inconsistent with the log information.

14. The information processing device according to claim 13, wherein the CPU is further configured to:

generate new persona information based on the specific information; and control the first terminal device to display the role based on the generated new persona information.

15. The information processing device according to claim 11, wherein the CPU is further configured to:

determine that at least a threshold number of pieces of information of the first data are inconsistent with the log information, wherein a category of a first piece of information of the pieces of information of the first data is common to a category of a second piece of the pieces of information of the first data; and detect the pieces of information of the first data as the inconsistency information, based on the at least threshold number of the pieces of information of the first data are inconsistent with the log information.

16. The information processing device according to claim 11, wherein the CPU is further configured to:

determine that at least a threshold number of pieces of information of the first data are inconsistent with the log information, wherein a category of a first piece of information of the pieces of information of the first data is common to a category of a second piece of the pieces of information of the first data;

evaluate the dialogue data of the first user with the second user based on specific information of the dialogue data that is inconsistent with the log information, wherein the second user is a dialogue partner of the first user;

determine a condition that the evaluation of the dialogue data is one of a threshold level or less than the threshold level; and prevent registration of the specific information in the log information storage unit based on the determined condition.

17. The information processing device according to claim 1, wherein the CPU is further configured to control a second terminal device to display a role of the second user, the second user is a dialogue partner of the first user, and the second terminal device is associated with the second user.

18. An information processing method, comprising:

acquiring persona information from a database via a network, wherein the persona information is stored in the database, and the persona information includes at least one of image information of a character or attribute information of the character;

controlling a first terminal device to display a role of a first user, wherein the role of the first user includes the persona information, and the first terminal device is associated with the first user;

acquiring first data from the first terminal device based on a first user input associated with the first user, wherein the first data includes dialogue data between the first user and a second user;

detecting inconsistency information based on the acquired first data, wherein the inconsistency information includes information of the dialogue data that is inconsistent with content of the persona information;

controlling the first terminal device to display a message based on the detected inconsistency information;

evaluating the persona information based on the displayed message;

updating the stored persona information based on the evaluation;

executing a machine learning algorithm to generate new image information, wherein the new image information is generated based on the updated stored persona information; and controlling the first terminal device to display the new image information.

* * * * *